Figure 1:
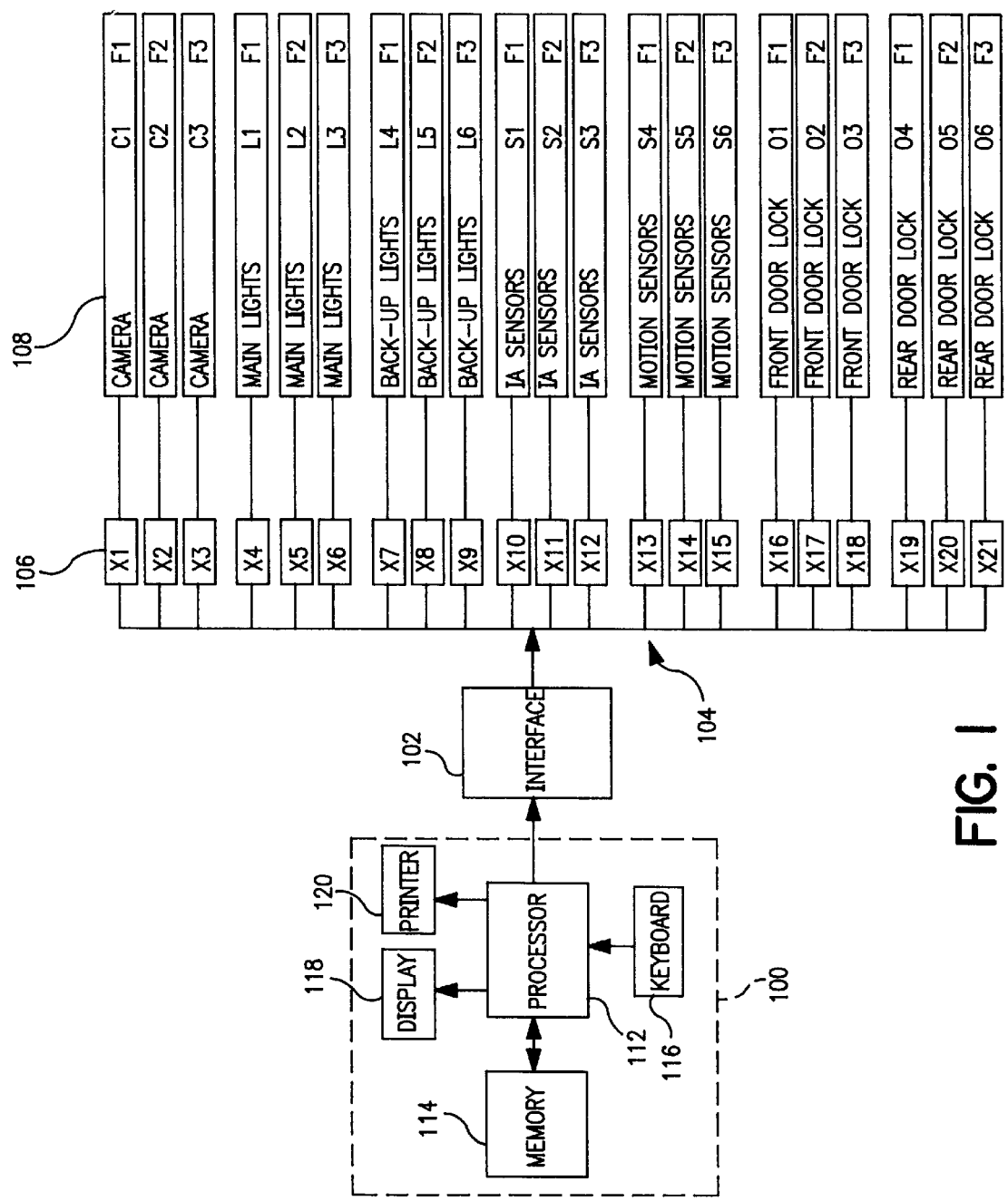

United States Patent [19]

Wachtel

[11] Patent Number: 5,870,701
[45] Date of Patent: Feb. 9, 1999

[54] CONTROL SIGNAL PROCESSING METHOD AND APPARATUS HAVING NATURAL LANGUAGE INTERFACING CAPABILITIES

[75] Inventor: Thomas Juliusz Wachtel, London, United Kingdom

[73] Assignee: Canon Kabushiki Kaisha, Tokyo, Japan

[21] Appl. No.: 871,846

[22] Filed: Jun. 9, 1997

Related U.S. Application Data

[63] Continuation of Ser. No. 470,200, Jun. 6, 1995, abandoned, which is a continuation of Ser. No. 109,583, Aug. 20, 1993, abandoned.

[30] Foreign Application Priority Data

Aug. 21, 1992 [GB] United Kingdom .................... 9217886

[51] Int. Cl.$^6$ ...................................................... G06F 17/28
[52] U.S. Cl. ...................................... 704/9; 704/1; 704/10; 395/12
[58] Field of Search ........................... 704/1, 9, 10, 257, 704/243; 345/326, 968, 969; 364/146, 188; 395/12

[56] References Cited

U.S. PATENT DOCUMENTS

| | | | |
|---|---|---|---|
| 4,638,445 | 1/1987 | Mattaboni | 364/424.01 |
| 4,829,423 | 5/1989 | Tennant et al. | 364/419.08 |
| 4,905,138 | 2/1990 | Bourne | 395/650 |

(List continued on next page.)

FOREIGN PATENT DOCUMENTS

| | | |
|---|---|---|
| 0369430 | 5/1990 | European Pat. Off. . |
| 0387226 | 9/1990 | European Pat. Off. . |
| 0522591 | 1/1993 | European Pat. Off. . |

OTHER PUBLICATIONS

Changwen, et al., "The Application of Chinese Natural Language Understand–to Robot Control," Proceeding of the 1988 IEEE International Conference on Systems, Man, and Cybernetics, Aug. 8–12, 1988, vol. 1, pp. 385–388.

Tseng, et al., "Extending the E–R Concepts to Capture Natural Language Semantics for Database Access," Proceedings Compsac '91. The 15th Annual International Computer Software & Applications Conference, Sep. 11–13, 1991, pp. 30–35.

Binot, et al., "LOKI: A Logic Oriented Approach to Data and Knowledge Bases Supporting Natural Language Interaction," Esprit '88. Putting the Technology to Use. Proceedings of the 5th Annual Esprit Conference, Nov. 14–17, 1988, pp. 562–577.

"Parsing English With A Link Grammar", D. Sleator, et al., Carnegie Mellon University School of Computer Science, Oct. 1991.

N.J. Haddock "Incremental Semantics and Interactive Syntactic Processing", PhD Thesis University of Edinburgh, 1988.

*Primary Examiner*—Joseph Thomas
*Attorney, Agent, or Firm*—Fitzpatrick, Cella, Harper & Scinto

[57] ABSTRACT

A signal processing method and apparatus suitable for processing input signals representative, for example, of words or other elemental units of a natural language, which signals fall into a plurality of different categories, is provided in which the category of each input signal is determined, search data dependent upon the category is stored, the search data stored in response to previous signals is searched in response to each new signal, the search performed being dependent upon the category of the new signal, and an output signal dependent upon the input signals and upon the results of the searches is provided. When natural language is processed, the output signals may thus be dependent upon the meaning of groups of input words or other elemental units and is provided in a form in which it may conveniently be further processed. An application of the invention in a computer control switching system is described enabling the operator to input switching instructions in natural language.

62 Claims, 13 Drawing Sheets

U.S. PATENT DOCUMENTS

| | | | |
|---|---|---|---|
| 4,920,499 | 4/1990 | Skeirik | 395/12 |
| 4,931,935 | 6/1990 | Ohira et al. | 364/419.08 |
| 4,984,178 | 1/1991 | Hemphill et al. | 395/2.64 |
| 5,086,385 | 2/1992 | Launey et al. | 364/188 |
| 5,095,432 | 3/1992 | Reed | 364/419.08 |
| 5,099,426 | 3/1992 | Carlgren et al. | 364/419.13 |
| 5,111,398 | 5/1992 | Nunberg et al. | 704/9 |
| 5,115,390 | 5/1992 | Fukuda et al. | 364/146 |
| 5,197,005 | 3/1993 | Schwartz et al. | 364/419.13 |
| 5,243,520 | 9/1993 | Jacobs et al. | 364/419.08 |
| 5,247,693 | 9/1993 | Bristol | 395/800 |
| 5,321,608 | 6/1994 | Namba et al. | 364/419.08 |
| 5,369,576 | 11/1994 | Heemels et al. | 704/9 |

CONTROL SIGNAL PROCESSING METHOD AND APPARATUS HAVING NATURAL LANGUAGE INTERFACING CAPABILITIES

This application is a continuation, of application Ser. No. 08/470,200 filed Jun. 6, 1995, now abandoned, which was a continuation of application Ser. No. 08/109,583 filed Aug. 20, 1993, abandoned.

This invention relates to a method and apparatus for signal processing. The invention is particularly but not exclusively applicable for converting input signals from a form representing individual words or other elements of a language, especially a natural language, to output signals in a form in which the meaning of groups of the words or other elements of the natural language is represented and which is suitable for further processing, for example, for providing control signals for controlling some subsequent process or apparatus in dependence upon the natural language input.

Although computer systems are currently in commercial use in a wide variety of different applications, such as for controlling industrial processes or for information storage and retrieval as in the creation and searching of data bases, current systems require instructions and information to be input in a form dictated by the system itself rather than in the natural language of the user.

A prerequisite for a computer system which can respond as required to input information or instructions in a natural language is an efficient signal processing method for converting input signals from a form representing the individual words or other elements of the natural language into output signals which are in a form which both represents the meanings of groups of the words or other elements of the natural language and which can be further processed. This is the case whether the information or instructions are for generating control signals dependent upon the meaning of the input language, for translating the input language to another language or for some other purpose. Although considerable research has been carried out in this area, the prior art has proposed systems known as parsers which have failed to meet the above indicated requirements.

An object of the invention is to provide an efficient signal processing method and apparatus which is particularly but not exclusively suitable for the above indicated purposes.

In one aspect, the invention provides a method and apparatus for producing output signals dependent upon input signals, for example signals representative of words or other elemental units of a natural language, which signals fall into a plurality of different categories, wherein the output signals comprise a first component derived from the input signals and a second component derived from the categories and dependent upon predetermined relationships between said categories.

In another aspect, the invention provides a method and apparatus for processing input signals, for example representative of words or other elemental units of a natural language, which signals fall into a plurality of different categories, wherein the category of each input signal is determined, search data dependent upon said category is stored, the search data stored in response to previous signals is searched and an output signal dependent upon the input signals and upon the results of the searches is provided.

Where the input signals represent words or other elements of a natural language, the categories may be lexical categories.

In accordance with the invention, accordingly, input signals which are in a form in which they may be representative of no more than the words in a string of words in a natural language may be converted to output signals in a form dependent upon the meaning of the string of words.

Although the invention has wide application, a single and relatively simple embodiment of the invention in a switch control system will be described for illustrating the manner in which the invention may be put into practice. It should be understood, however, that the invention is applicable to much more complex systems.

Figure 2:
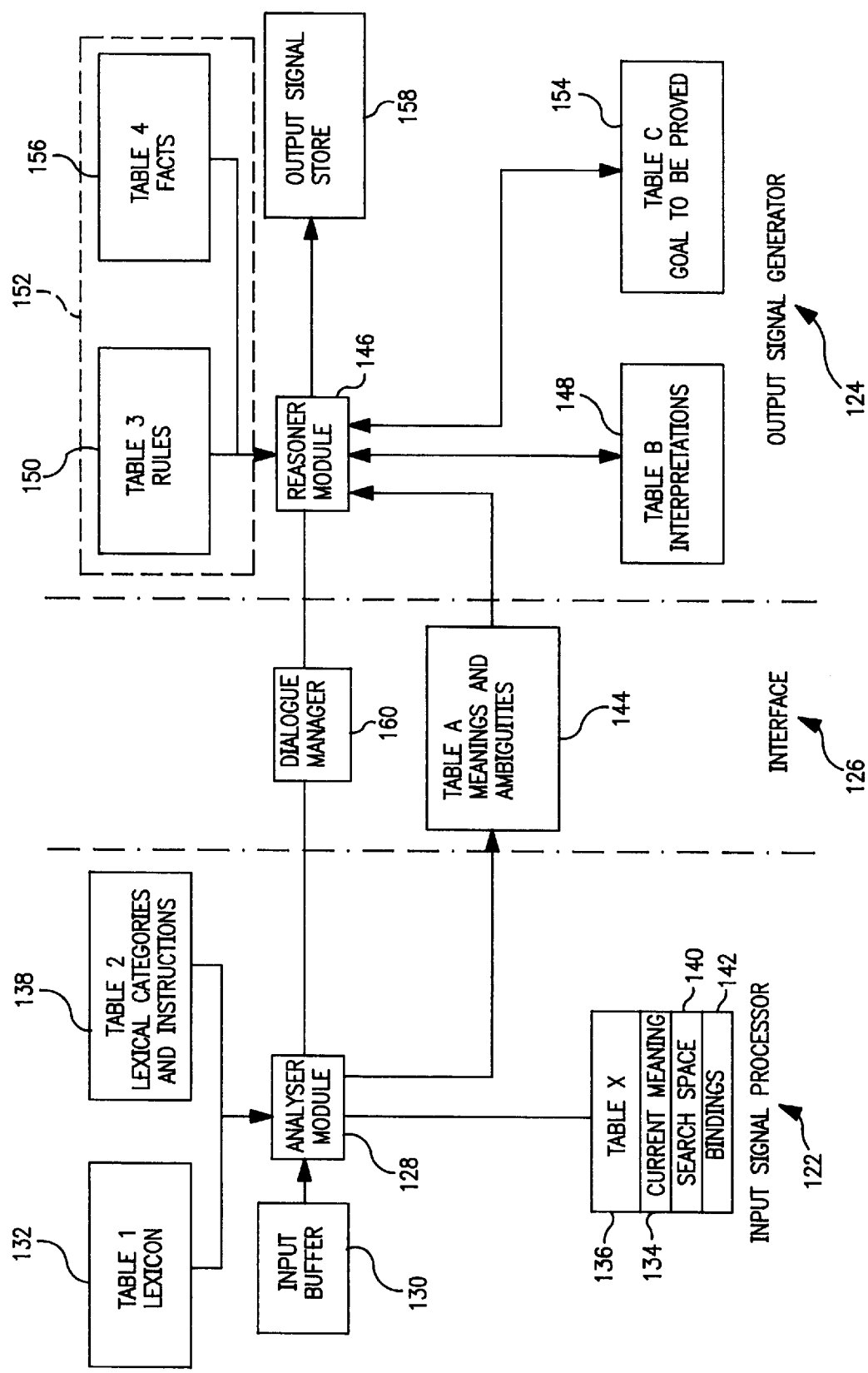

The invention is described further by way of example with reference to the accompanying drawings, in which:

FIG. 1 is a block diagram of a control apparatus which is for switching on and off a number of different devices in a building and which incorporates a preferred embodiment of the invention enabling an operator of the apparatus to input switching instructions in natural language;

FIG. 2 is a diagram illustrating in block form the contents of a computer memory included in the system of FIG. 1 for the processing of signals derived from the input natural language to provide signals representative of the meaning thereof and to generate therefrom output control signals; and FIGS. 3 to 15 are diagrams to assist the understanding of the processing, in the preferred embodiment of the invention, of signals derived from words of a number of different categories.

Although the preferred embodiment of the invention will be described as forming a part of the switching control apparatus shown in FIG. 1 for the purpose of illustrating an application of the invention, it should be understood that a relatively simple switching control apparatus has been shown for assisting understanding of the invention and that the invention in fact provides a powerful, fast and efficient signal processing technique which, in practice, may form part of much larger and more complex systems for a variety of different applications.

OVERVIEW OF EMBODIMENT

The control apparatus of FIG. 1 comprises a computer system 100 connected through an interface 102 and a network 104 to a bank of switches 106 which control a set of devices 108 which, by means of the switches 100, can be turned on and off. In this embodiment, the devices 108 are TV cameras, main and back-up lights, infra-red sensors, motion sensors and front and rear door locks on each of three floors of a building. There are twenty-one switches in the bank 106 and these are identified as switches X1 to X21. Switches X1 to X3 control respectively TV cameras C1 to C3 located respectively on the first, second and third floors. Switches X4 to X6 control main lights L1 to L3 on the first to third floors. Switches X7 to X9 control back-up lights L4 to L6 on the three floors. Switches X10 to X12 control infra-red sensors S1 to S3 on the three floors. Switches X13 to X15 control motion sensors S4 to S6 on the three floors. Switches X16 to X18 control front door locks D1 to D3 on each of the three floors and switches X19 to X21 control rear door locks D4 to D6 on the three floors.

The computer system 100 comprises a processor 112, memory 114 which stores programs and data for the control of the operation of the system and provides working memory space, a conventional keyboard 116 for inputting instructions and information and a visual display unit 118 and printer 120 for respectively displaying and printing information output by the processor 112. The visual display unit 118 may be arranged for displaying images received from the TV cameras C1 to C3 or alternatively a separate monitor (not shown) may be provided for this purpose. Provision may be made for displaying the image from more than one camera on the unit 118 (or monitor if provided) at the same time, if desired.

The computer system 100 is arranged so that the operator of the system may input, through the keyboard 116, instructions for the operation of the devices 108 in a natural language, in this embodiment English, in words of his own choice. The memory 114 stores data and programs for causing the processor 112 to process the signals which are derived from the keyboard 116 and which represent the input instructions, to produce output signals which are in the form of an address X1 to X21 for identifying the switch to be operated and a status signal to indicate whether the addressed switch is to be switched on or switched off. The output signals produced by the computer system 100 will be represented herein in the form Xn:on or Xn:off where n indicates the number of the switch or switches being addressed. These output signals are supplied to the interface 102 and broadcast on network 104 for detection and response by the switch or switches in bank 106 which are addressed.

Since the system is arranged to permit the operator to input instructions in words of his own choice, instructions to perform the same operation can be input in a number of different forms. For example, an instruction intended to result in the switching on of the camera C3 on the third floor could be entered by the operator in any of the following forms:

1) "Activate the camera on the third floor".
2) "Observe the third floor".
3) "Watch the people on the third floor".

In order to achieve the required result, the computer system 100 must process the different combinations of signals derived from the keyboard 116 representing these three different forms of instruction in a manner which produces the same output signal X3:on for broadcast via the interface 102 and network 104. In fact, as will become apparent, this embodiment is arranged so that the words "observe" and "watch" will not only switch on the camera on the relevant floor but will also switch on the main lights. As a result, in the case of instructions 2 and 3 above the signals which are output by the computer system 100 are X3:on and X6:on.

In the processing of instruction signals from the keyboard 116, the computer system 100 performs the following two basic processes:

1) In the first process, a set of signals is produced which is dependent, firstly, upon the words which are input and, secondly, upon the relationships or links which may exist between them having regard to the grammar of the language used. This set of signals is also dependent upon any ambiguities which may arise in the input words, as a result of which the input words may have different possible interpretations. For example, in the sentence "activate the camera on the third floor", the word "camera" is qualified by the word "activate" as it is the camera which is to be activated and also the words "third floor" qualify the word "camera" since it is the camera on the third floor, not some other camera, which is to be activated. Although in the context of the embodiment shown in FIG. 1, the intended meaning of the sentence "activate the camera on the third floor" is perfectly clear, linguistic analysis of the sentence discloses two distinct interpretations and the sentence is therefore ambiguous. The ambiguity arises from the fact that the phrase "on the third floor" could either be a contraction of the clause "which is on the third floor" which qualifies the word "camera", or could be qualifying the verb "activate", as an adverb would. One possible interpretation of the sentence, therefore, is that it is the camera which is on the third floor which is to be activated regardless of where the activation is performed. The other possible interpretation is that the activation is to be performed on the third floor ie. a switch located on the third floor is to be activated to turn on a camera whose location is not defined. As indicated, the computer system 100 operates, at this point, to provide a set of signals which define and preserve the different possible interpretations of ambiguous sentences when establishing the relationships or links between the words in the input sentence.

2) In the second process, the set of signals which was obtained by the first process is then processed with respect to a knowledge base which stores data related to the switches of bank 106 and the devices 108 to determine whether the instruction represented by the input signal is a valid instruction and if so which switch to actuate. If there is ambiguity in the input sentence, then different sets of signals representative of the different interpretations are derived and each such set may be processed against the knowledge base to determine whether any of the sets of signals (and therefore any of the possible interpretations of the input instruction) is valid. Where a valid set of signals is found, an appropriate output signal or signals is produced for broadcasting on the network 104.

FIG. 2 represents in block form program modules and data structures in the form of tables which are provided in memory 114 for performing the above two processes. These are divided in FIG. 2 into an input signal processor 122 which performs the first process, an output signal generator 124 which performs the second process and an interface section 126 for interfacing between the input signal processor 122 and the output signal generator 124. The input signal processor 122 and interface 126 will be described first. Thereafter, the output signal generator 124 will be described.

Input Signal Processor 122

The input signal processor 122 comprises an analysis program module 128 which obtains each incoming word in turn from an input buffer 130 and, upon obtaining each such word, first refers to a look-up table 132, herein termed a lexicon. The lexicon 132 contains a list of all words which may be processed upon input via the keyboard 116 and defines the grammatical categories of those words ie. whether they are nouns, prepositions, transitive verbs etc . . . . In this embodiment, although the lexicon need only contain a relatively small vocabulary and may only utilise words in a few categories, the input signal processor 122 is preferably arranged as a general purpose system which can be used in many different applications. For this purpose, the lexicon is preferably structured for containing words of the following categories:

Nouns
Prepositions
Auxiliary verbs
Negation
Transitive verbs
Intransitive verbs
Determiners
Possessive determiners
Adjectives
Adverbs
Intensifiers Complementisers "To" (the infinitival particle) as used in infinitives and as a category in itself Infinitival complement verbs, herein called "To verbs" ie. verbs which take infinitival complement clauses (eg. "I want to . . . ")

"Whose" as a category in itself, the correct description of which is "possessive relative pronoun".

The above categories will be adequate for many applications. However, other categories of word may be provided for if desired.

In addition to containing an indication of the categories of the input words which may be processed, the lexicon 132 contains a representation of the meaning of each of the input words. Each representation is in the form of a predicate with one or more arguments, the number of arguments provided being dependent upon the category of the input word. The predicate represents the meaning of the input word itself in a form which is recognisable by the output signal generator 124. The arguments provide the means for deriving representations which are dependent upon the relationship or connection between the input words.

By way of example, the contents of lexicon 132 may be as set out below in Table 1:

TABLE 1

| INPUT WORD | WORD CATEGORY | MEANING |
|---|---|---|
| show | transitive verb | show(1,2,3) |
| view | transitive verb | show(1,2,3) |
| inspect | transitive verb | show(1,2,3) |
| observe | transitive verb | show(1,2,3) |
| see | transitive verb | show(1,2,3) |
| examine | transitive verb | show(1,2,3) |
| watch | transitive verb | show(1,2,3) |
| illuminate | transitive verb | illuminate(1,2,3) |
| light | transitive verb | illuminate(1,2,3) |
| activate | transitive verb | activate(1,2,3) |
| deactivate | transitive verb | deactivate(1,2,3) |
| use | transitive verb | activate(1,2,3) |
| see | transitive verb | see(1,2,3) |
| seen | transitive verb | en(_,1) |
|  |  | see(1,2,3) |
| seeing | transitive verb | ing(_,1) |
|  |  | see(1,2,3) |
| saw | transitive verb | past(_,1) |
|  |  | see(1,2,3) |
| extinguish | transitive verb | extinguish(1,2,3) |
| cut | transitive verb | cut(1,2,3) |
| lock | transitive verb | lock(1,2,3) |
| unlock | transitive verb | unlock(1,2,3) |
| open | transitive verb | open(1,2,3) |
| close | transitive verb | close(1,2,3) |
| secure | transitive verb | secure(1,2,3) |
| opened | transitive verb | past(_,1) |
|  |  | open(1,2,3) |
| turned | transitive verb | past(_,1) |
|  |  | turn(1,2,3) |
| turns | transitive verb | turn(1,2,3) |
| switch | transitive verb | change(1,2,3) |
| on | adverb | change-on(1,2) |
| off | adverb | change-off(1,2) |
| wants | to verb | want(1,2,3) |
| wanted | to verb | past(_,1) |
|  |  | want(1,2,3) |

|  | WORD CATEGORY | INPUT WORD |
|---|---|---|
| everything | noun | everything(1,2) |
| sensor | noun | sensor (1,2) |
| sensors | noun | several(_,1) |
|  |  | sensor(1,2) |
| lock | noun | lock(1,2) |

TABLE 1-continued

| locks | noun | several(_,1) |
|  |  | lock(1,2) |
| alarm | noun | alarm(1,2) |
| alarms | noun | several(_,1) |
|  |  | alarm(1,2) |
| door | noun | door(1,2) |
| doors | noun | several(_,1) |
|  |  | door(1,2) |
| camera | noun | camera(1,2) |
| cameras | noun | several(_,1) |
|  |  | camera(1,2) |
| light | noun | light(1,2) |
| lights | noun | several(_,1) |
|  |  | light(1,2) |
| video | noun | video(1,2) |
| videos | noun | several(_,1) |
|  |  | video(1,2) |
| floor | noun | floor(1,2) |
| floors | noun | several(_,1) |
|  |  | floor(1,2) |
| basement | noun | basement(1,2) |
| basements | noun | several(_,1) |
|  |  | basement(1,2) |
| building | noun | building(1,2) |
| buildings | noun | several(_,1) |
|  |  | building(1,2) |
| machine | noun | machine(1,2) |
| person | noun | person(1,2) |
| situation | noun | situation(1,2) |
| state | noun | state(1,2) |
| people | noun | several(_,1) |
|  |  | person(1,2) |
| Sunday | noun | Sunday(1,2) |
| Monday | noun | Monday(1,2) |
| Tuesday | noun | Tuesday(1,2) |
| Wednesday | noun | Wednesday(1,2) |
| Thursday | noun | Thursday(1,2) |
| Friday | noun | Friday(1,2) |
| Saturday | noun | Saturday(1,2) |
| one | noun | one(1,2) |
| two | noun | two(1,2) |
| three | noun | three(1,2) |
| four | noun | four(1,2) |
| five | noun | five(1,2) |
| six | noun | six(1,2) |
| seven | noun | seven(1,2) |
| eight | noun | eight(1,2) |
| nine | noun | nine(1,2) |
| ten | noun | ten(1,2) |
| eleven | noun | eleven(1,2) |
| twelve | noun | twelve(1,2) |
| noon | noun | noon(1,2) |
| midnight | noun | midnight(1,2) |
| morning | noun | morning(1,2) |
| afternoon | noun | afternoon(1,2) |
| evening | noun | evening(1,2) |
| yesterday | adverb | yesterday(1,2) |
| today | adverb | today(1,2) |
| tomorrow | adverb | tomorrow(1,2) |
| tonight | adverb | tonight(1,2) |
| ground | adjective | ground(1,2) |
| first | adjective | first(1,2) |
| second | adjective | second(1,2) |
| third | adjective | third(1,2) |
| front | adjective | front(1,2) |
| rear | adjective | rear(1,2) |
| infrared | adjective | infrared(1,2) |
| motion | adjective | motion(1,2) |
| main | adjective | main(1,2) |
| backup | adjective | backup(1,2) |
| small | adjective | small(1,2) |
| new | adjective | new(1,2) |
| blue | adjective | blue(1,2) |
| red | adjective | red(1,2) |
| the | determiner | the(1,2) |
| a | determiner | a(1,2) |
| an | determiner | an(1,2) |
| whose | whose | of(1,2,3) |

TABLE 1-continued

| | | |
|---|---|---|
| she | noun | the(_,1) |
| | | female(1,2) |
| he | noun | the(_,1) |
| | | male(1,2) |
| her | noun | the(_,1) |
| | | female(1,2) |
| him | noun | the(_,1) |
| | | male(1,2) |
| her | possessive determiner | the(_,1) |
| | | the(_,2) |
| | | female(_,2) |
| | | of(1,2) |
| his | possessive determiner | the(_,1) |
| | | the(_,2) |
| | | male(_,2) |
| | | of(1,2) |
| very | intensifier | very(1,2) |
| suddenly | adverb | sudden(1,2) |
| please | adverb | spkrrequest(1,2) |
| yesterday | adverb | yesterday(1,2) |
| today | adverb | today(1,2) |
| tomorrow | adverb | tomorrow(1,2) |
| not | negation | neg(1,2) |
| to | to | comp(1,2) |
| will | auxiliary | will(1,2) |
| would | auxiliary | would(1,2) |
| ought | auxiliary | ought(1,2) |
| can | auxiliary | can(1,2) |
| must | auxiliary | must(1,2) |
| have | auxiliary | perfect(1,2) |
| has | auxiliary | perfect(1,2) |
| be | auxiliary | copula(1,2) |
| is | auxiliary | copula(1,2) |
| been | auxiliary | en(_,1) |
| | | copula(1,2) |
| in | preposition | in(1,2,3) |
| with | preposition | with(1,2,3) |
| for | preposition | for(1,2,3) |
| near | preposition | near(1,2,3) |
| on | preposition | on(1,2,3) |
| at | preposition | at(1,2,3) |
| by | preposition | by(1,2,3) |
| of | preposition | of(1,2,3) |
| who | complementizer | person(1,2) |
| which | complementizer | entity(1,2) |
| that | complementizer | entity(1,2) |

It will be evident from inspection of the above Table 1 that the left-hand column contains a list of the words which, when input through the keyboard 116, may be processed by the system 100, the middle column contains the category of each word and the right-hand column contains the meanings of the input words. It will be noted that although the vocabulary of the lexicon is relatively small, it nevertheless contains a number of words which would not normally be used by an operator controlling the switching system illustrated in FIG. 1. The purpose of including such other words is to illustrate the generality of the signal processor according to the present invention. Thus, it is possible, in accordance with the invention, to provide if convenient a large vocabulary in the lexicon so that a particular embodiment of the invention may be used in a number of different applications each of which might use a different part of the common vocabulary.

The output signal generator 124 is arranged to recognise the representations of meaning which are contained in the third column of the lexicon. Although the names of the predicates of some of the representations of meaning in Table 1 are the same as the corresponding input words themselves, this is not essential but is merely for convenience of description. It should thus be understood that any convenient representations of meaning may be used in practice.

It will also be noted that a number of the input words are mapped to the same representation of meaning, for example, the input words "show", "view" and "inspect" are all mapped to the meaning "show(1,2,3)". This is a convenient way, in the present embodiment, of assigning the same meaning to different input words where it is intended that such different input words should have the same effect as each other in the output signal generator 124.

The English language includes a number of further word categories in addition to those indicated above. For example, pronouns are not mentioned in Table 1. However, reference to Table 1 will show that the pronouns which the present embodiment can process are categorised as nouns. Other embodiments may use only some of the above categories or may use more categories than the above as already indicated.

As each input word is obtained by the analyser module 128 from the input buffer 130, the analyser module 128 searches the words shown in the left-hand column of Table 1 for the same word and, when this is found, obtains the corresponding meaning shown in the third column of Table 1, assigns unique values to the arguments and inserts that meaning with the values assigned to the arguments into the section 134 of memory area 136, which is initially empty, thus building up in section 134 a list of the meanings. The values are assigned as a continuous sequence of numbers from one word to the next. In this embodiment, it will be assumed that the sequence of values begins at the number 901. Thus, if the first word is a noun, which category has two arguments in its meaning, its meaning is assigned the values 901 and 902. If the next word is a transitive verb, which category requires three values, its meaning is assigned the values 903, 904 and 905. If the word after that is a determiner, which category requires two values, its meaning is assigned the values 906 and 907, and so on.

From consideration of Table 1, it can be seen that if the sentence "activate the camera on the third floor" is input via the keyboard, the following will be stored in section 134 of Table X:

activate(901, 902, 903)
the(904, 905)
camera(906, 907)
on(908, 909, 910)
change-on(911, 912)
the(913, 914)
third(915, 916)
floor(917, 918).

The meanings "on(908,909,910)" and "change-on(911, 912)" both occur because the word "on" has two meanings in the lexicon 132 and each possible meaning of this word therefore needs to be processed.

In the above example, the meaning of each of the input words as obtained from the lexicon consists of a single predicate. Inspection of Table 1, however, shows that the meanings of a number of the input words comprise two or more predicates each being provided with arguments. When words having more than one predicate are processed, all of the predicates are stored in the current meaning section 134 of Table X. The value of the arguments is determined by taking the last of the predicates shown in the lexicon as relating to the particular input word, assigning to its arguments the next two or three-numbers in the sequence of values (as the case may be) and putting the same values in the arguments of the other predicates relating to that input word as indicated by the numbers 1 or 2 etc. in the arguments of those other predicates. This will be understood by considering the processing of the words "the machine turned his video on". The corresponding entries in the meaning column of the lexicon together with the values assigned to the arguments are indicated below with the input words in the left hand column below and the meanings and arguments in the right hand column below:

| | |
|---|---|
| the | the(901,902) |
| machine | machine(903,904) |
| turned | past(__,905) |
| | turn(905,906,907) |
| his | the(__,908) |
| | the(__,909) |
| | male(__,909) |
| | of(908,909) |
| video | video(910,911) |
| on | on(911,912,913) |
| on | change-on(914,915) |

In any language, the grammar defines the different categories of words which may qualify each other and the order in which the words are spoken or written to convey the required meaning. For example, in the English language, an adjective precedes a noun which it qualifies. An adverb may precede or succeed the verb which it qualifies. A noun may be the subject or object of a verb which qualifies the noun. If a noun is the subject of a transitive verb, the noun usually precedes the verb. If a noun is the object of a transitive verb, the verb normally precedes the noun. A transitive verb may thus qualify both a preceding noun which forms the subject of the verb and a succeeding noun which forms the object. A noun which is qualified by an adjective and which forms the subject or object of a transitive verb is connected both to the adjective and to the transitive verb. Thus, as a phrase, clause or sentence is spoken or written each new word may qualify or be qualified by a previous word or words and/or may have the potential for qualifying or being qualified by a future word or words which have not yet been written or spoken.

Where one word qualifies or is qualified by another, the two words will be referred to herein as connected to each other or bound to each other and data or signals defining the condition that one word qualifies or is qualified by another will be referred to as a link or binding.

In the present embodiment, these bindings are stored in the form of equations by which the value of a selected argument of the meaning of the current word is equated to the value of a selected argument of the meaning of a previously received word which qualifies or is qualified by the current word. If the current word qualifies the preceding word, the selected value of the meaning of the current word is placed on the left-hand side of the equation and that of the preceding word is placed on the right-hand side of the equation. If the current word is qualified by the preceding word, the selected value of the meaning of the current word is placed upon the right-hand side of the equation and that of the preceding word is placed upon the left-hand side of the equation. Thus, taking the words "the camera" from the first of the above examples, the binding

905=906 is formed since the determiner "the" qualifies the noun "camera". As another example, taking the words "camera on" the binding

909=907 is formed on the basis that the preposition "on" qualifies the noun "camera".

The input signal processor 122 includes a table 138 which contains instructions for establishing connections or bindings between the meanings of the current word and of a preceding word or words dependent upon the categories of the current and preceding words and the grammar of the language. This processing involves:

a) Storing in search space 140 of memory area 136 a search code or codes dependent upon the category of the current word and storing, with each search code, the value of a selected argument of the meaning of the current word.

b) Carrying out a search in the search space 140 f or one or more occurrences of a previously stored search code or search codes, the search carried out being dependent upon the category of the current word.

c) Where the search is successful, defining a binding utilising the value stored with the previously stored search code found in the search and a value assigned to a selected argument of the meaning of the current word, and storing the binding in section 142 of memory area 136.

d) In the case of certain categories of word, removing from search space 140 certain previously stored search codes to prevent those search codes being found in a subsequent search.

The following Table 2 represents the instructions stored in table 138:

TABLE 2

| CURRENT WORD CATEGORY | CODES TO BE SEARCHED FOR | ARGUMENT OF MEANING OF CURRENT WORD TO BE USED IF SEARCH SUCCESSFUL | WHETHER ARGUMENT OF MEANING OF CURRENT WORD TO BE PLACED ON RIGHT OR LEFT OF BINDING | SEARCH CODE AND ARGUMENT OF MEANING OF CURRENT WORD TO BE STORED | PREVIOUSLY STORED SEARCH CODE TO BE REMOVED |
|---|---|---|---|---|---|
| noun | dn | 1 | R | n/2 | |
| | an | 2 | R | | |
| | obj | 2 | R | | |
| preposition | p | 2 | L | p/1, obj/3 | dn/x |
| | v | 2 | L | | |
| | n | 2 | L | | |
| | dn | x | | | |
| auxiliary | auxv | 1 | R | v/1, auxv/2 | |
| negation | v | 2 | L | v/1 | |
| to | v | 2 | R | | |
| transitive | av | 1 | R | v/1, obj/3 | n/2 |
| verb | auxv | 1 | R | | |
| | n | 2 | L | | |

TABLE 2-continued

| CURRENT WORD CATEGORY | CODES TO BE SEARCHED FOR | ARGUMENT OF MEANING OF CURRENT WORD TO BE USED IF SEARCH SUCCESSFUL | WHETHER ARGUMENT OF MEANING OF CURRENT WORD TO BE PLACED ON RIGHT OR LEFT OF BINDING | SEARCH CODE AND ARGUMENT OF MEANING OF CURRENT WORD TO BE STORED | PREVIOUSLY STORED SEARCH CODE TO BE REMOVED |
|---|---|---|---|---|---|
| "to verb" | av | 1 | R | v/1, n/3 | n/2 |
|  | auxv | 1 | R |  |  |
|  | n | 2 | L |  |  |
| intransitive verb | av | 1 | R | v/1 | n/2 |
|  | auxv | 1 | R |  |  |
|  | n | 2 | L |  |  |
| determiner | — | — | — | dn/2 |  |
| possessive determiner | — | — | — | dn/2 |  |
| adjective | aa | 1 | R | an/2 | aa/1 |
| adverb | aa | 1 | R | av/2 | aa/1 |
|  | v | 2 | L |  |  |
| intensifier | — | — | — | aa/2 |  |

As can be seen, the first column of Table 2 lists the word categories. The second column lists the previously stored search codes which are searched for when processing a word of the categories shown in the first column. The third column indicates the argument of the meaning of the current word which will be used in the binding to be formed if the search is successful. The fourth column indicates whether that binding is to be placed on the right hand side or the left hand side of the equation which forms the binding. This, as already indicated, is dependent upon whether the current input word being processed is qualified by or qualifies the previous word in response to the processing of which the search code searched for was stored. The fifth column lists the search codes to be stored in search space 140 when processing the current word and the argument of the current word whose value is to be stored with that search code. The sixth column of Table 2 indicates the previously stored search codes to be removed from the search space when found by a search performed in response to the processing of the current word. The storage of the codes and arguments shown in the fifth column of Table 2 takes place after the searching described with reference to the second column and the removal described with reference to the sixth column.

The searches which are performed start at the latest stored search code and work backwards from that. Where the search is for a code stored in response to a previous word of a category which will qualify the current word, the searching is terminated upon finding the latest occurrence of that search code. Thus, the designation "R" in the fourth column of Table 2 indicates not only which way the binding is to be recorded but also indicates that the searching is to be terminated upon finding the first (i.e. the latest stored) occurrence of the related code. Where the search is for a code stored in response to processing of a previous word of a category such that the current word qualifies the preceding word, the search is for all occurrences of the relevant code which are currently in the search space 140. Thus the instruction "L" in the fourth column of Table 2, in addition to indicating the direction of the binding to be formed, also indicates that all occurrences of the relevant code should be searched for and that bindings should be formed upon the finding of each occurrence of that code.

The manner in which words of different categories are processed in accordance with the instructions of Table 2 to establish the bindings will be understood from the following detailed description of the processing of each word category with reference to Table 2 and FIGS. 3 to 15. In each of these drawings, the highlighted block indicates the category of the current word being processed, the blocks below that indicate the categories of previously received word which may qualify or may be qualified by the current word category and the blocks in the upper part of the drawing indicate the categories of future words which may qualify or be qualified by the current category of word. The blocks also indicate by the numbers 1, 2 and 3 the arguments of the meanings of the words which fall in those categories respectively. The arrows indicate which of the arguments are used for defining the bindings and the direction of the arrows indicates whether the current word is qualified by or qualifies the words of the other categories. An arrow pointing to the current word category indicates that it is qualified by the other word. An arrow pointing away from the current word category indicates that the current word qualifies the other word.

Consideration of FIGS. 3 to 15 will show that the first argument of the meaning of all categories of word is used for forming a binding with another category where the current word is qualified by the word of the other category (except in the case of "to" as a particle, determiners, possessive determiners and intensifiers, none of which, in the grammar of the embodiment, are qualified by words of any other category and thus the first argument is unused in these cases). It will be further noted that in no case is the first argument of the meaning of any category of word used to form a binding indicative of that word qualifying another word. Except in the case of nouns, which in the grammar of the preferred embodiment do not qualify, but are only qualified by, other categories of word, the second and third arguments of a current word meaning are used for forming bindings indicating that the current word qualifies other words. In the embodiment illustrated, the first argument of the meaning of a preposition, transitive verb or "to verb" is used for bindings where the word is being qualified and the second and third arguments are used for independent bindings where the word is qualifying a preceding or succeeding word or words respectively. Selection of the number of arguments for each category may be made taking into account the requirement for the provision of independent bindings between the current word and the words qualified by it.

From the above description, it will be further understood that the direction of the arrows in FIGS. 3 to 15 between the current word category and the previous word categories indicate whether the search for the particular code in question is terminated upon finding the latest occurrence thereof or whether the search continues to find all occurrences thereof. An arrow pointing from the current category to the previous category, indicates that the current word qualifies the previous word and thus also indicates that the search will continue for all occurrences of the relevant code. An arrow pointing from the category of a previous word to the category of the current word indicates that the current word is qualified by the previous word and that the search will be terminated upon finding the first occurrence (i.e. the latest stored occurrence) of the relevant search code. The search codes which are searched for forming the bindings indicated by the arrows are marked on FIGS. 3 to 15. The position of each code marked in FIGS. 3 to 15 indicate the argument whose value is stored in the search space 140 with the respective code.

Figure 3:
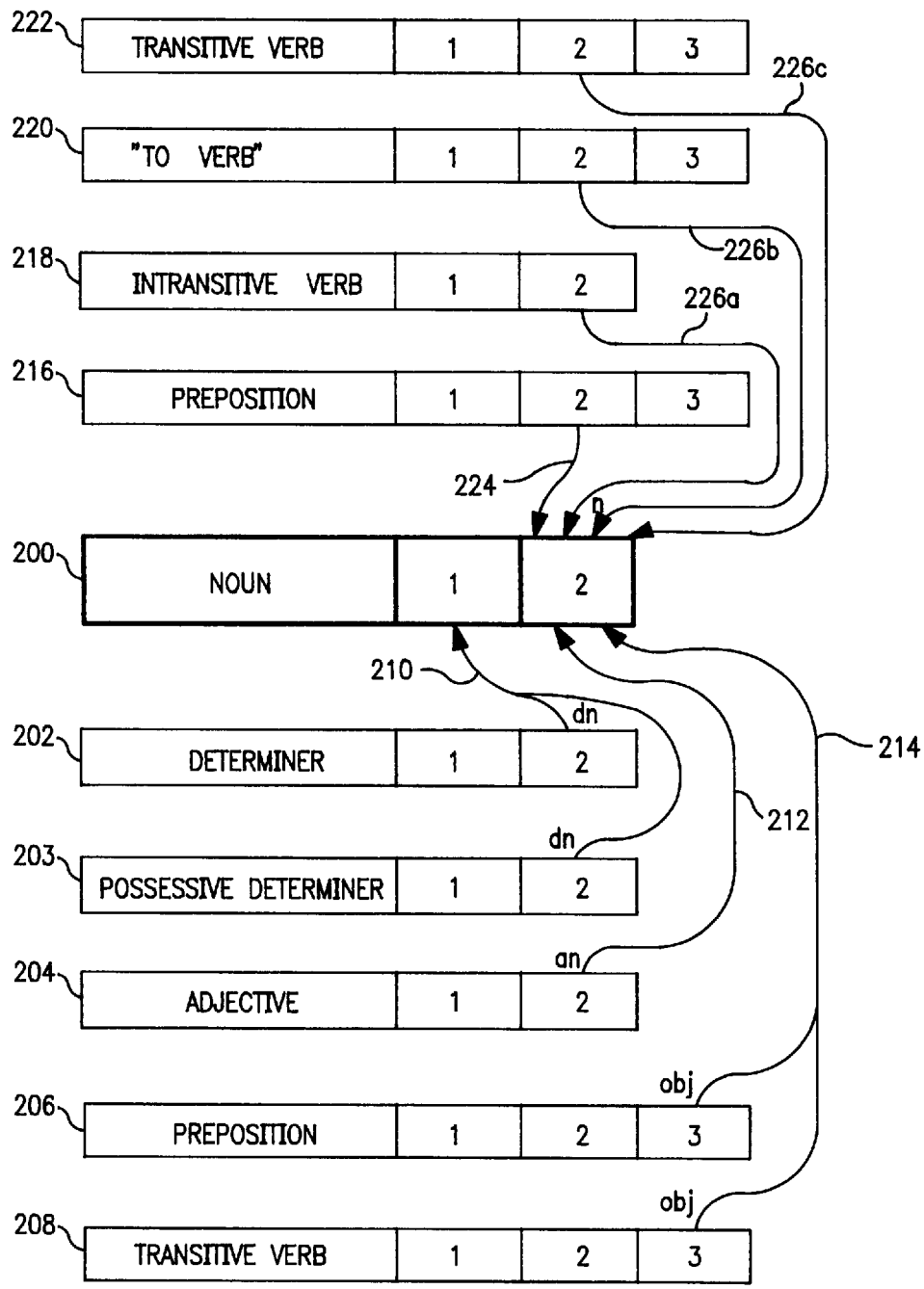

Nouns—FIG. 3

In the grammar of the present embodiment, nouns may be qualified by previous determiners, possessive determiners, adjectives, prepositions and transitive verbs. Thus, in FIG. 3, block 200, representing the meaning of a noun and its arguments, is positioned above blocks 202, 204, 206 and 208 representing respectively the meanings of determiners, possessive determiners, adjectives, prepositions and transitive verbs. As shown in column 5 of Table 2 above, processing of a determiner or possessive determiner results in the code "dn" together with the second argument of the meaning thereof being stored in search space 140, processing of an adjective results in the search code "an" together with the second argument of the meaning of the adjective being stored in search space 140 and processing of a preposition or transitive verb results in the search code "obj" together with the third argument of the meaning of the preposition or transitive verb respectively being stored in search space 140. Thus, when a noun is processed and following assignment of values to the first and second arguments of the meaning of the noun, searches for the codes "dn", "an" and "obj" are performed in turn in the search space 140, as indicated by the instructions for nouns in the second column of Table 2.

If the search for the code "dn" is successful, a binding is formed between the variable forming the first argument of the meaning of the noun, as indicated in the third column of Table 2 and the variable stored with the search code "dn", which variable is that which forms the second argument of the meaning of the previously processed determiner or possessive determiner. Since the noun is qualified by the determiner or possessive determiner, rather than vice versa, column 4 of Table 2 indicates that the variable forming the first argument of the meaning of the noun should be placed on the right-hand side of the equation constituting the binding and this is further represented by the direction of arrow 210 represents the relevant binding in FIG. 3. If there is more than one occurrence of the code dn in the search space 140, the search is terminated upon finding the first occurrence. As already explained, the codes stored in search space 140 are searched in reverse order starting from the last code inserted and thus if there is more than one occurrence of any search code, the binding is formed with the latest stored occurrence.

The second search performed when processing a noun is for the code "an" and, as shown by the arrow 212 in FIG. 3, and by the instructions in the third and fourth columns of Table 2, if the search is successful, a binding is formed between the variable forming the second argument of the meaning of the noun and that associated with the code "an", which is the variable which forms the second argument of the meaning of the adjective. Again, the direction of the arrow 212 and the instruction "R" in the fourth column of Table 2 indicates that the noun is qualified by the adjective and thus the search is terminated at this point.

The arrow 214 in FIG. 3 indicates a binding which may be formed as a result of the third search performed when processing nouns, namely the search for the code "obj". As indicated, this code is stored in search space 140 in response to the processing of prepositions and transitive verbs. However, this search is terminated upon finding the latest occurrence of the code "obj" in the search space 140.

Thus, it can be seen from the lower part of FIG. 3 that when a noun is processed, up to three bindings may be stored in section 142 of memory space 136, one of the bindings being between the value assigned to the first argument of the meaning of the noun and the value assigned to the second argument of the meaning of the last received determiner or possessive determiner (whichever was the last received), another being between the value assigned to the second argument of the meaning of the noun and the value assigned to the second argument of the meaning of the last received adjective and the third being between the value assigned to the second argument of the meaning of the noun and the value assigned to the third argument of the meaning of either the last received preposition or the last received transitive verb, whichever was the last received.

The fifth column of Table 2 indicates that when a noun is processed the search code "n" together with the value assigned to the second argument of the meaning of the noun is stored in search space 140. As indicated in the second column of Table 2, the code "n" is searched for by prepositions, transitive verbs, "to verbs" and intransitive verbs. Thus, if at a future stage in the processing, a preposition is received, the search performed in response to the preposition may find the code "n" and a binding consequently formed between the value assigned to the second argument of the meaning of the preposition and that assigned to the second argument of the meaning of the noun. Similarly, bindings may be formed between the second argument of the meaning of a future transitive verb, "to verb" or intransitive verb and the second argument of the meaning of the noun. This is indicated in the upper part of FIG. 3, in which reference numbers 216, 218, 220 and 222 indicate respectively blocks representing future processed prepositions, intransitive verbs, "to verbs" and transitive verbs. Arrow 224 represents a binding between the second argument of the meaning of such a future preposition and the second argument of the meaning of the noun, with the preposition qualifying the noun. Arrow 226 represents a binding formed between the second argument of the meaning of the noun 200 and either the second argument of the meaning of a future transitive verb or the second argument of the meaning of a future "to verb" or the second argument of the meaning of a future transitive verb, whichever is received first. There cannot be a binding with an argument of more than one of these verb categories since, as shown in column 6 of Table 2, each of these verb categories removes the code "n" from search space 140 upon finding that code in the search space thus prohibiting any future bindings utilising that code. Thus, it will be appreciated that whereas there can be a binding between the meaning of a noun and the meaning of a future preposition and the meaning of the same noun and the meaning of a future transitive verb, for example, provided the preposition is processed before the transitive verb, there cannot be a binding between the meaning of the noun and the meaning of a future preposition if a transitive verb, "to verb" or intransitive verb is processed before the preposition is processed.

This arises because, although these verb categories remove the code "n" from the search space when found, prepositions do not.

Although FIG. 3 indicates bindings that may be formed between the meaning of a noun and the meaning of future word categories in addition to indicating bindings which may be formed between a noun and previously received word categories, it should be understood that the preferred embodiment of the invention operates by searching the search space 140 only for codes stored in response to processing of previous words.

Figure 4:
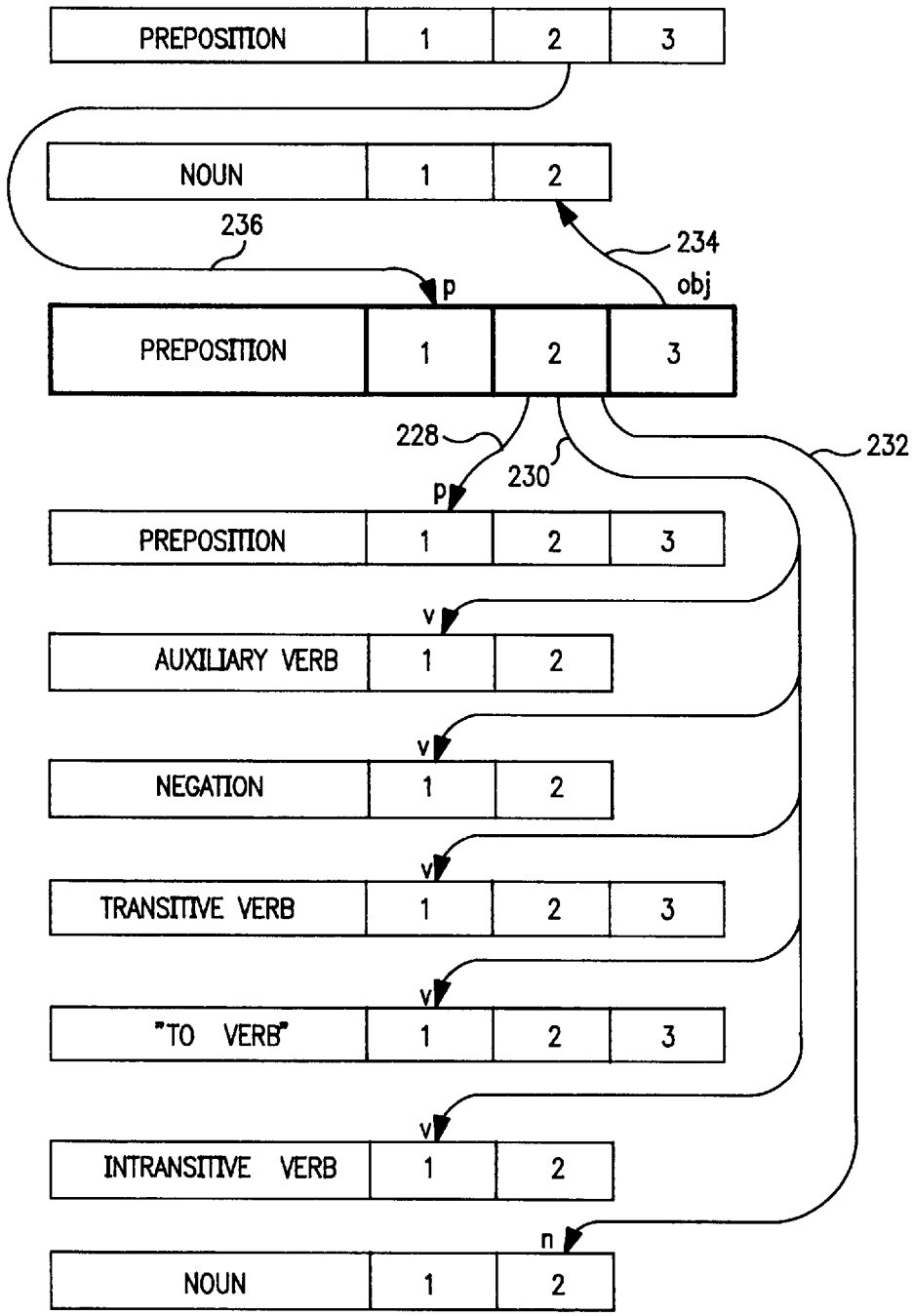

Prepositions—FIG. 4

In accordance with the grammar of the preferred embodiment, prepositions can qualify previous prepositions, auxiliary verbs, negations, transitive verbs, "to verbs", intransitive verbs and nouns. As shown in Table 1, the meanings of prepositions have three arguments, and searches for the codes "p", "v" and "n" are performed in response to prepositions. As seen from the fifth column of Table 2, the code "p" will have been stored in space 140 in response to processing of a previous preposition together with the variable assigned to the first argument of the meaning thereof, the code "v" will have been stored in response to processing of any previous auxiliary verb, negation, transitive verb, "to verb" or intransitive verb together with the variable assigned to the respective first argument of the meaning thereof and the code "n" will have been stored in response to any previously processed noun together with the variable assigned to the second argument of the meaning thereof.

Arrow 228 indicates that the variable assigned to the second argument of the meaning of the current preposition and the variable assigned to the first argument of the meaning of a preceding preposition are used to define a binding indicating that the current preposition qualifies a preceding preposition. Such binding is established as a consequence of the search for the code "p" upon processing of the current preposition. Arrow 230 indicates that the variable assigned to the second argument of the meaning of the preposition is also used, with the first argument of the meaning of any preceding auxiliary verb, negation, transitive verb, "to verb" or intransitive verb, to define bindings with the meaning of words of those categories. Arrow 232 indicates that the variable assigned to the second argument of the meaning of the currently processed preposition is also used for defining a binding with the variable assigned to the second argument of the meaning of a previously processed noun.

As will be clear from the above description, searching for the codes "p", "v" and "n" when processing prepositions is performed so as to find all occurrences of these codes in the search space 140 and the processing forms bindings with all of them.

As will be more fully understood from consideration of Example 1 to be given later, the bindings represented by arrows 228, 230 and 232, if two or more such bindings occur simultaneously, represent an ambiguity.

As indicated in the instructions for prepositions in the second column of Table 2, a search for the code "dn" is also performed when processing a preposition. However, no binding is formed if the search code is found. However, as indicated by column 6 of Table 2, code "dn" is removed. This prevents a binding being formed between variables of a noun and a preceding determiner where there is a preposition in between.

As indicated in the instructions for processing prepositions in the fifth column of Table 2, when a preposition is processed, the code "p" together with the value assigned to the first argument of the meaning of the current preposition and the code "obj" together with the value assigned to the third argument of the current preposition are stored in search space 140. Arrow 234 in FIG. 4 indicates that a search performed in response to processing of a future noun, which search would find the code "obj", would result in the formation of a binding between the value assigned to the meaning of the third argument of the meaning of the preposition and the value assigned to the second argument of the meaning of the future noun. Arrow 234 is thus consistent with arrow 214 in FIG. 3.

Arrow 236 in FIG. 4 indicates that if a search in response to the search in response to a future preposition finds the code "p", a binding is formed between the variable assigned to the first argument of the meaning of the current preposition and the binding assigned to the second argument of the meaning of the future preposition. Arrow 234 indicates that the preposition qualifies a future noun. Arrow 236 indicates that the current preposition is qualified by the future preposition. Arrow 236 is consistent with arrow 228 also in FIG. 4.

Having described the processing of nouns and prepositions in detail with reference to Table 2 and FIGS. 3 and 4, the processing of other categories of words will be readily understood from consideration of Table 2 and FIGS. 5 to 15 and thus only a brief description of the processing of the remaining categories will be given.

Figure 5:
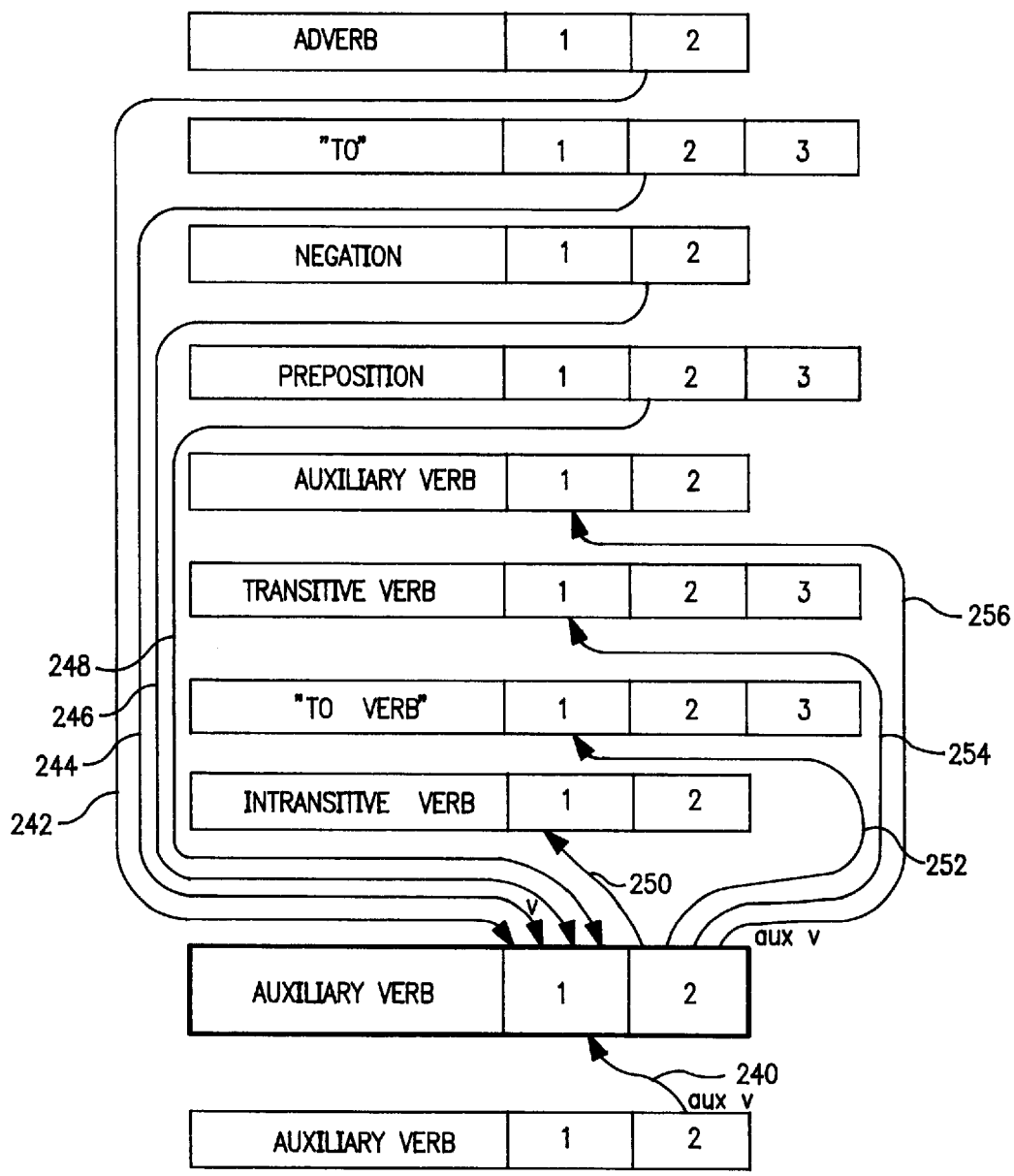

Auxiliary Verbs—FIG. 5

As can be seen from consideration of FIG. 5 and Table 2, auxiliary verbs initiate a search for the code "auxv". The only category of word which stores this code in search space 140 is auxiliary verbs. Arrow 240 indicates that if the search initiated by a current auxiliary verb is successful in finding this code, a binding between the second argument assigned to the meaning of the previous auxiliary verb and the first argument of the meaning of the current auxiliary verb is formed, the current auxiliary verb being qualified by the previous one. The search is terminated upon finding the first occurrence (last stored occurrence) of "auxv".

As seen from column 6 of Table 2, no search codes are removed from the search space when processing an auxiliary verb.

When an auxiliary verb is processed, the codes "v" and "auxv" with the first and second arguments of the meaning thereof respectively are stored in the search space 140.

Adverbs, the word "to", negations and prepositions all initiate a search for the code "v" when processed. Arrows 242, 244, 246 and 248 in FIG. 5 indicate respectively that a binding may be formed between the second argument of the meaning of a future adverb, "to", negation or preposition and the first argument of the current auxiliary verb. The direction of these arrows in FIG. 5 indicates that the current auxiliary verb would be qualified by any such future words.

The arrows 250, 252, 254 and 256 in FIG. 5 indicate bindings which may be formed between the second argument of the meaning of a current auxiliary verb and the first argument of the meaning of a future intransitive verb, "to verb", transitive verb or auxiliary verb as a result of a future search for the code "auxv", the direction of these arrows indicating that the latter will be qualified by the current auxiliary verb. The arguments of the meanings of the future word categories used in the binding will be clear from Table 2 and from FIG. 5.

Although the eight arrows 242 to 256 indicate the possibility of eight bindings, it will be understood that in practice only one, or a small number of, the possibilities for bindings may be formed even though, for example, the current auxiliary verb may be followed by words of several categories which may qualify or be qualified by it. The number of bindings formed will depend upon the order of the future words, whether searching in response to the future words is terminated as soon as the relevant search code is found and whether the relevant codes are removed when processing such future words.

For example, if the current auxiliary verb is followed by a further auxiliary verb directly or at some point thereafter, the code "auxv" stored in response to the processing of the current auxiliary verb will be removed in response to processing of the subsequent auxiliary verb so that any transitive verb, "to verb" or intransitive verb following the second auxiliary verb will result in a binding with that rather than the first mentioned auxiliary verb.

Figure 6:
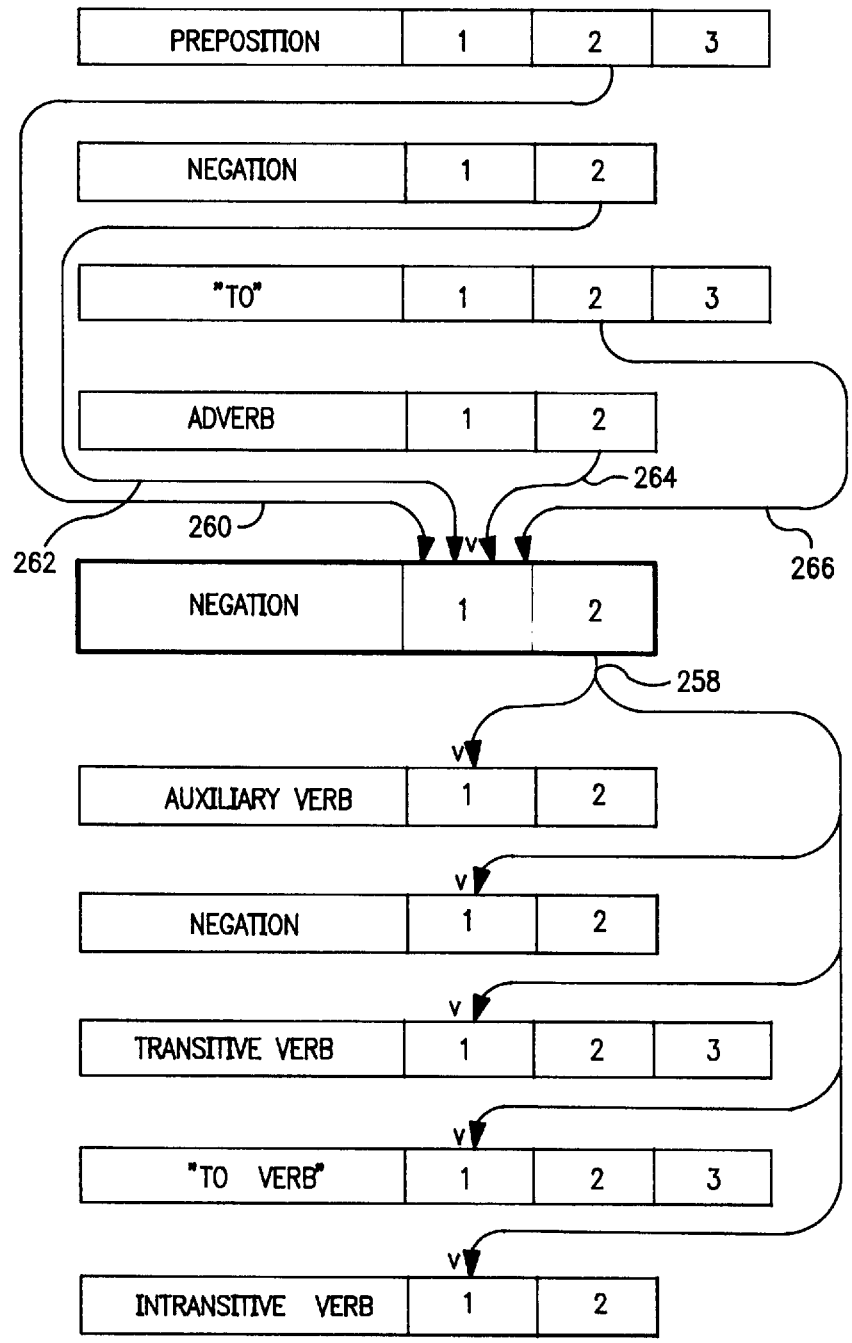

Negation—FIG. 6

A negation initiates a single search in search space 140 for the code "v". That code is stored in response to the processing of auxiliary verbs, negation, transitive verbs, "to verbs" and intransitive verbs, and thus the arrow 254 in FIG. 6 indicates the possibility of a binding being formed in response to the processing of a current negation. Searching is continued to find all occurrences of the code and corresponding bindings will be formed.

A negation initiates the storage in search space 140 of the code "v" (together with the first argument of the meaning). Prepositions, negation, "to" and adverbs initiate searching for the code "v". Thus, in FIG. 6, arrows 260, 262, 264 and 266 indicate future bindings which may be formed after processing of a negation. As already indicated, the directions of the arrows 258 to 266 indicate which word category is being qualified.

Figure 7:
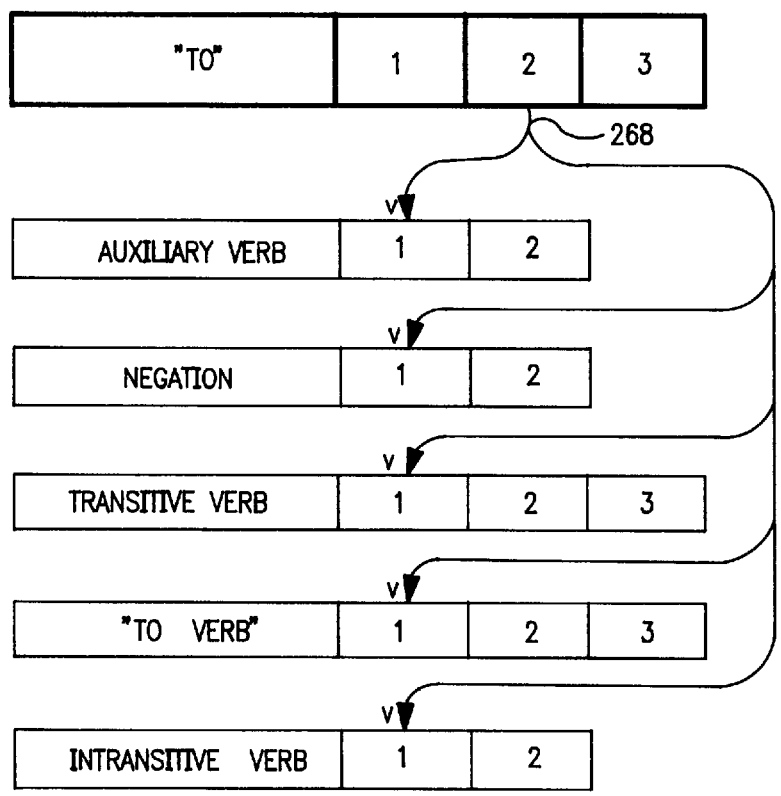

"To" (the infinitival Particle)—FIG. 7

Processing of the word "to" (the infinitival particle not the preposition) initiates a search for the code "v". The categories of word which initiate storage of this code have been indicated above in the description of FIG. 6. Thus, in FIG. 7, the arrow 268 indicates that searching continues to find all occurrences of the code "v" and corresponding bindings are formed.

No codes are stored in search space 140 in response to the word "to".

Figure 8:
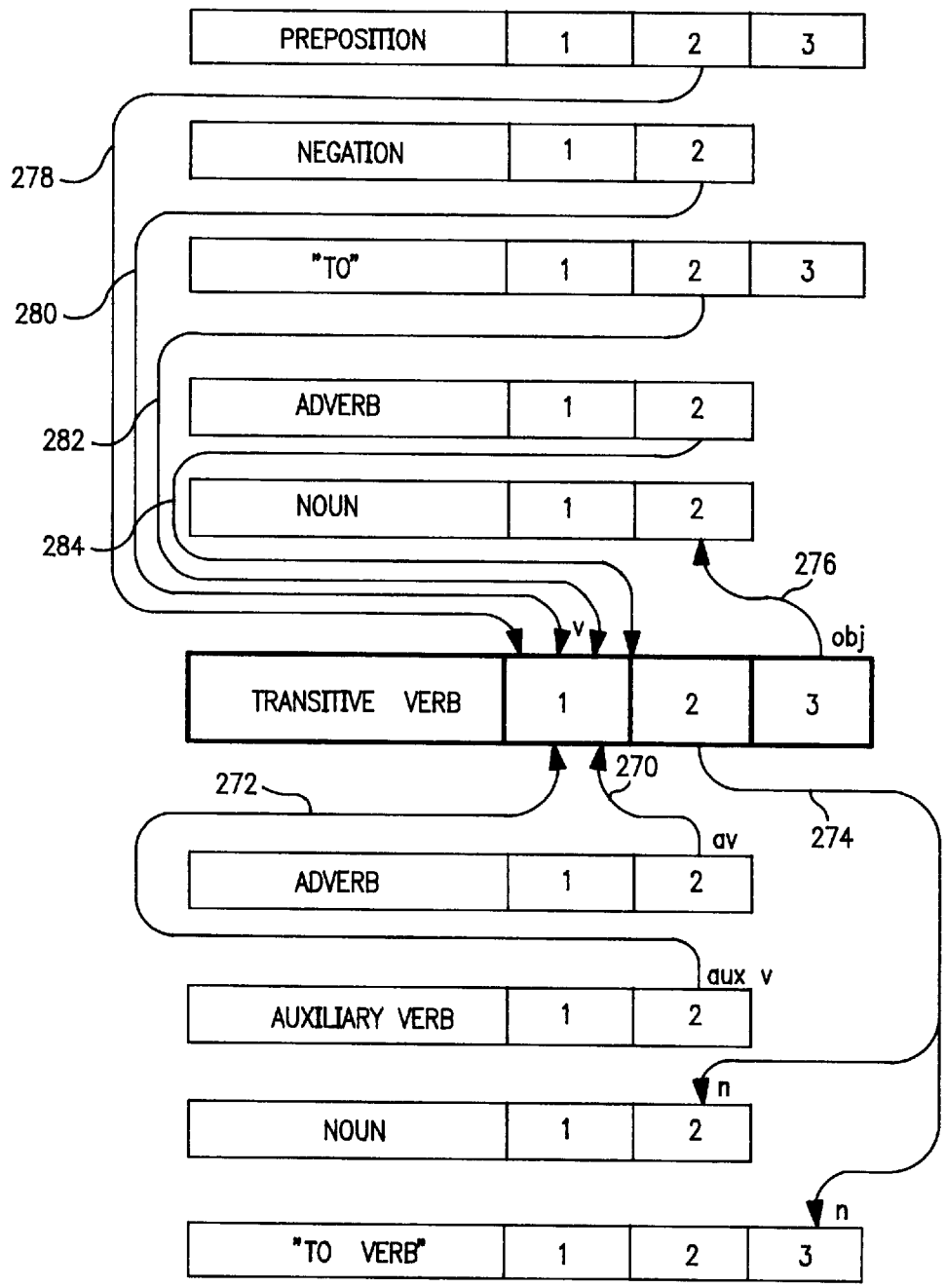

Transitive Verbs—FIG. 8

Arrow 270 indicates a binding which may be formed between the meaning of a previous adverb and a current transitive verb as a result of the search for the code "av" initiated in response to processing of the current transitive verb. Searching for the code "av" is terminated upon finding the latest occurrence. Arrow 272 indicates a binding which may be formed between the meaning of a previous auxiliary verb and the current transitive verb as a result of the search for the code "auxv". Searching for the code "auxv" is terminated upon finding the latest occurrence. Arrow 274 indicates the binding which may be formed between a previous noun or a previous "to verb" as a result of a search for the code "n" initiated in response to processing the current transitive verb. Searching for the code "n" is continued to find all occurrences, and appropriate bindings are formed. Each occurrence of the code "n" is removed from search space 140 when found in the search.

Arrow 276 indicates a possible future binding between the meaning of the current transitive verb and the meaning of a future noun as a result of a search for the code "obj" initiated by the future noun.

Arrows 278, 280, 282 and 284 indicate bindings which may be formed between the meaning of the current transitive verb and the meaning of a future preposition, negation, the particle "to" or adverb as a result of searches initiated by these word categories for the code "v" which is stored in response to processing of transitive verbs. As will be apparent from the above description, whether or not more than one of these bindings is formed will depend upon the order of the future word categories.

Figure 9:
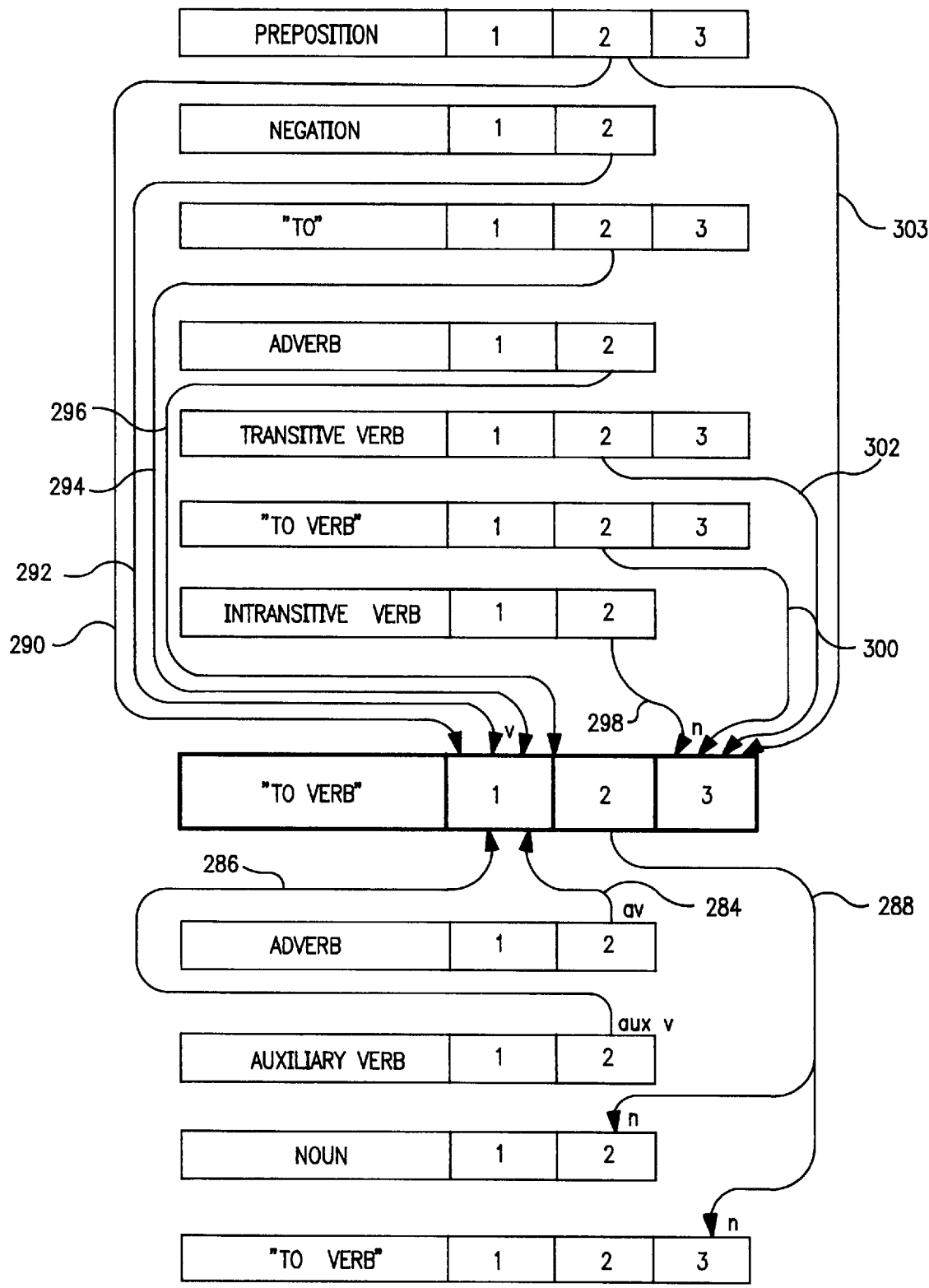

"To Verbs"—FIG. 9

Arrows 284 and 286 indicate bindings which may be formed as a result of processing of a current "to verb" and the resulting search for the codes "av" and "auxv" respectively. The search for the code "av" is terminated on finding the latest occurrence. This also applies to the search for the code "auxv". Arrow 288 indicates bindings which may be formed as a result of the search for code "n" in response to processing the current "to verb". The search for the code "n" continues so that all occurrences are found and appropriate bindings are formed. Each occurrence of "n" which is found is removed.

Processing of "to verbs" results in storage of the codes "v" and "n" in search space 140. Arrows 290, 292, 294 and 296 represent bindings which may be formed in the future as a result of searches for the code "v" in response to processing of prepositions, negations, the word "to", and adverbs. Arrows 298, 300 and 302 indicate bindings which may be formed in the future as a result of a search for the code "n" when processing a future transitive verb, "to verb" or intransitive verb.

Figure 10:
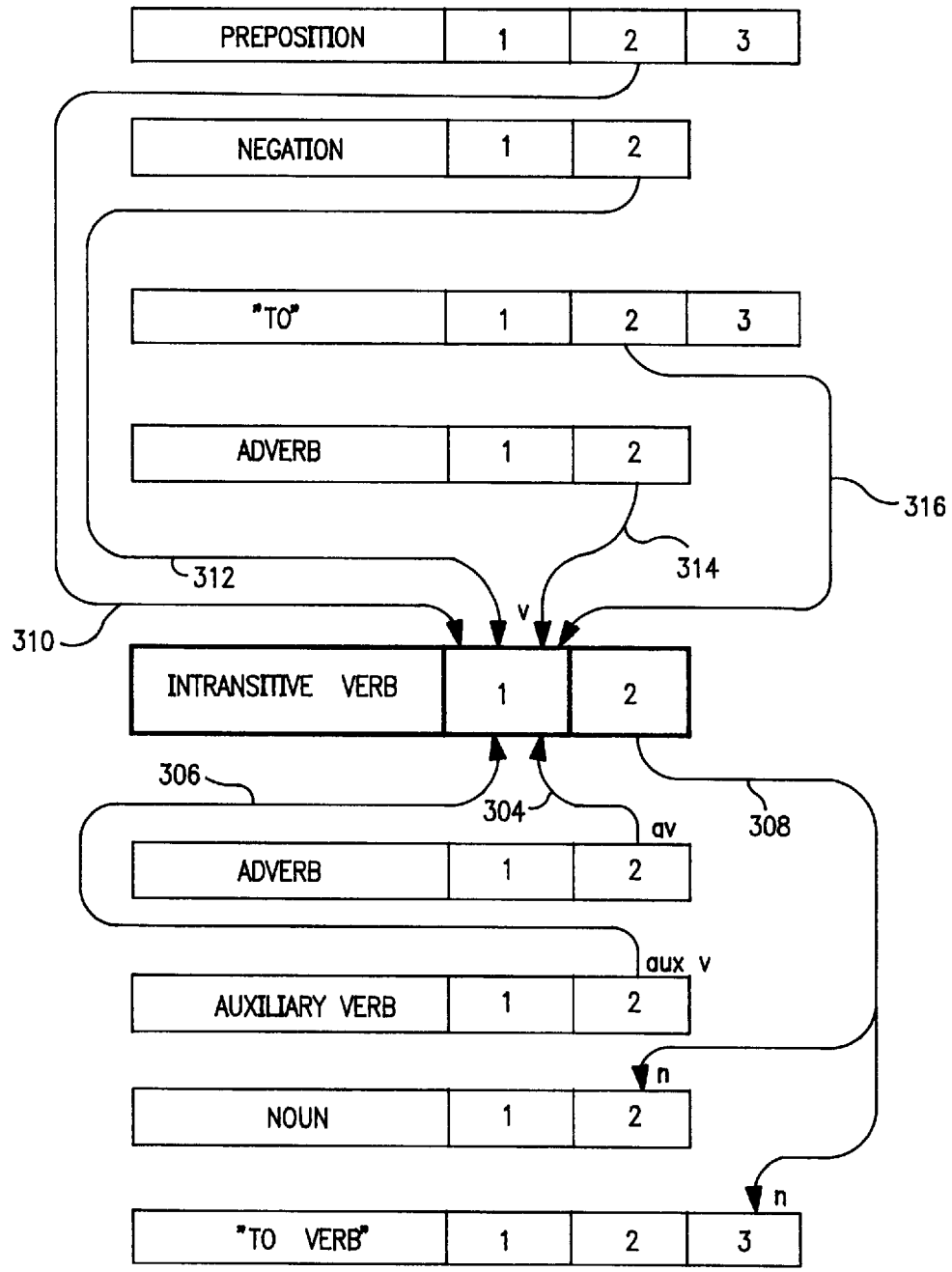

Intransitive Verbs—FIG. 10

Arrows 304, 306 and 308 indicate bindings which may be formed as a result of processing of a current intransitive verb and the searches consequently performed for the codes "av", "auxv" and "n" respectively. The search for these codes is performed as described with reference to transitive verbs and "to verbs", including removal of the code "n".

Processing of intransitive verbs results in the storage of the code "v" in search space 140. Arrows 310, 312, 314 and 316 indicate bindings which may be formed in the future as a consequence of searches for this code performed in response to processing of prepositions, negations, the word "to" and adverbs.

Figure 11:
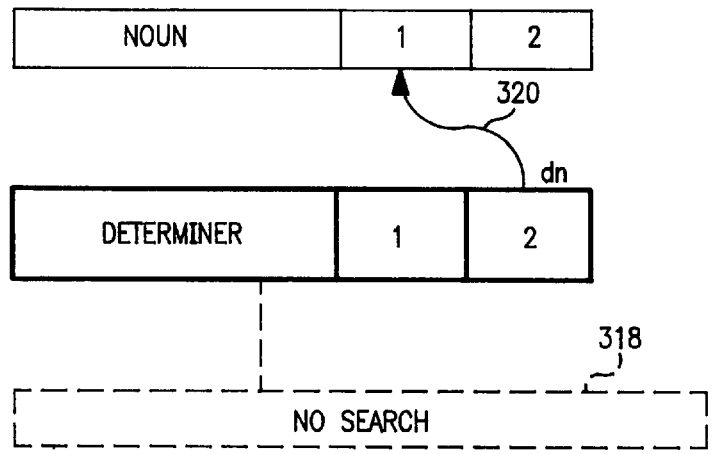

Determiners—FIG. 11

In FIG. 11, the dotted line block 318 indicates that when a determiner is processed, no searches in search space 140 are performed and therefore no bindings with the meanings of previous words can be formed when processing determiners and no search codes are removed from the space 140.

Processing of determiners results in storage of the code "dn" in search space 140. Arrow 320 in FIG. 11 indicates a possible future binding as a result of the search for this code performed when processing nouns.

Figure 12:
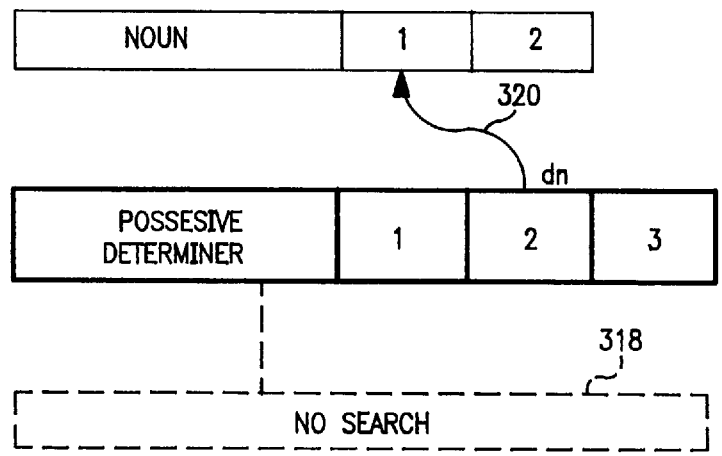

Possessive Determiners—FIG. 12

Possessive determiners are treated in the same way as determiners in the present embodiment. Accordingly, reference numbers 310 and 320 in FIG. 12 have the same meaning as the corresponding numbers in FIG. 11.

Figure 13:
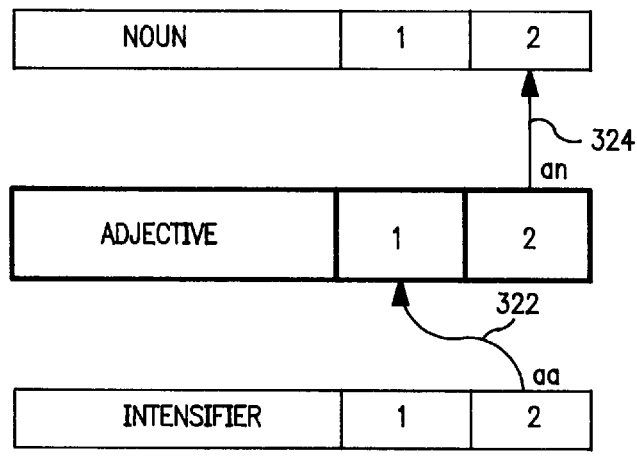

Adjectives—FIG. 13

Arrow 322 indicates a binding which may be formed between the meaning of a current adjective and that of a previous intensifier as a result of a search for the code "aa" performed when processing an adjective. As is clear from Table 2, if such a search is successful, the code "aa" is removed from the search space thereafter so that a further binding with that code cannot be formed even if a further future adjective or a future adverb is processed. Searching is terminated on finding the latest occurrence of "aa".

The processing of adjectives results in storage of the code "an" in search space 140 and arrow 324 in FIG. 13 indicates a possible future binding between the meaning of the current adjective and the meaning of a future noun which may be processed.

Figure 14:
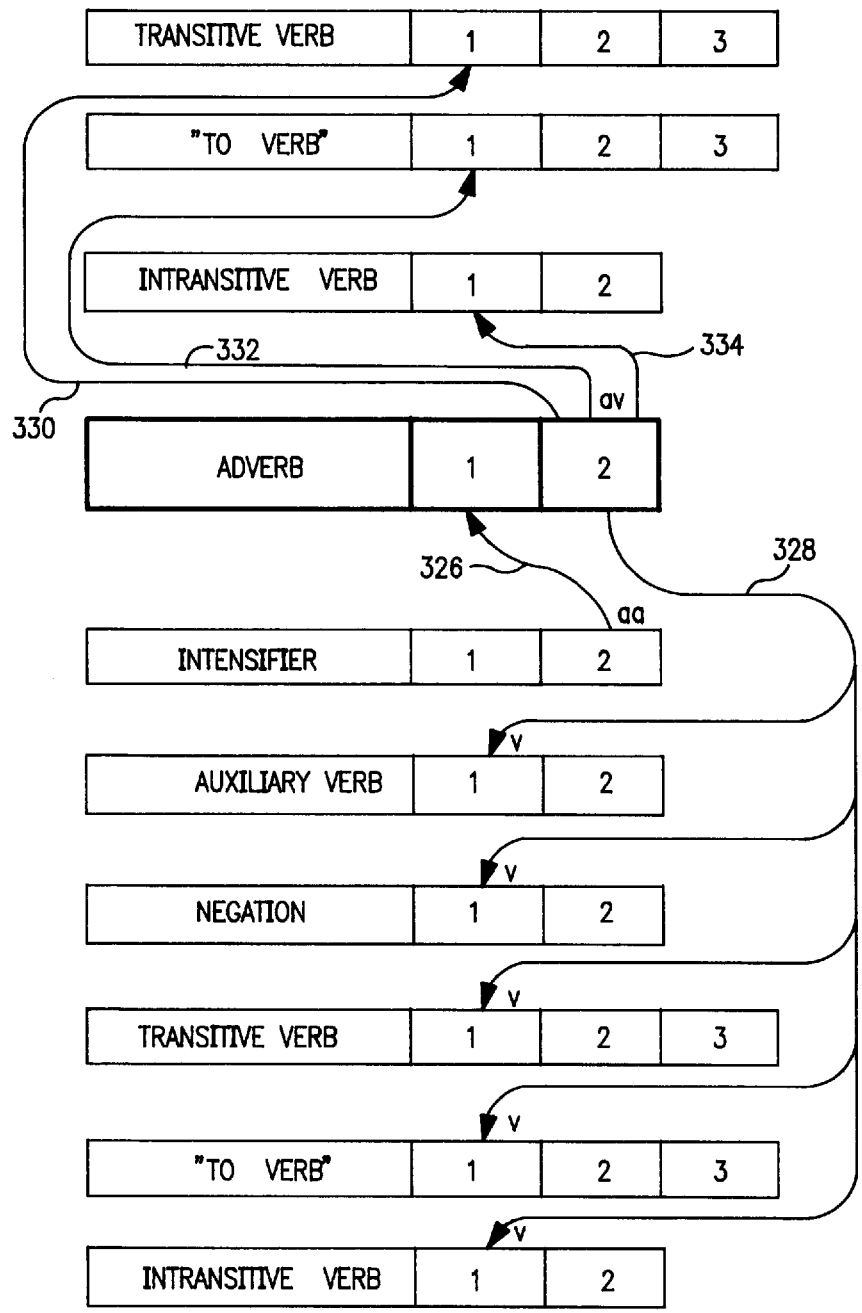

Adverbs—FIG. 14

Arrows 326 and 328 in FIG. 14 indicate bindings which may be formed between the meaning of a current adverb and the meanings of previous words as a result of searches for the codes "aa" and "v" performed in response to the processing of the current adverb. If the search for the code "aa" is successful, that code is removed as indicated in Table 2. Searching is terminated upon finding the latest occurrence of "aa". The search for the code "v" continues so that all occurrences are found and bindings are formed with each. The finding of the code "v" in this search does not cause removal thereof.

The processing of adverbs results in the storage of the code "av" in the search space 140. Arrows 330, 332 and 334 represent possible future bindings as a result of searches for this code by future words of the different categories indicated.

Figure 15:
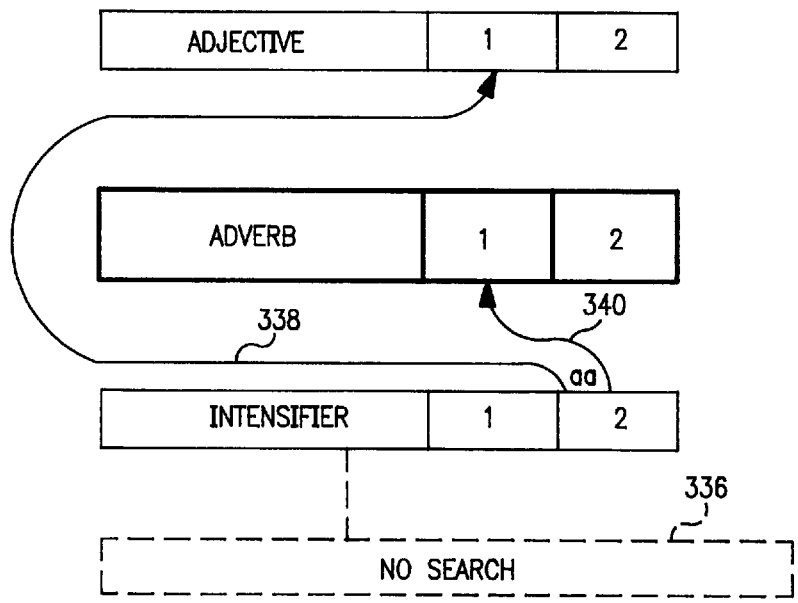

Intensifiers—FIG. 15

Dotted line block 336 indicates that when an intensifier is processed, no searching of search space 140 takes place and no codes are removed from the search space 140. The processing of intensifiers results in the storage insert space 140 of the code "aa". Arrows 338 and 340 in FIG. 15 indicate a possible future binding being formed upon processing a future adjective or adverb. As already noted, processing of either of these categories results in removal of the code "aa", if found, so that only one of these bindings can be formed.

Meanings with two or more predicates

The above description of processing with reference to Table 2 and FIGS. 3 to 15 has not dealt with processing of words whose meanings have more than one predicate. The way in which such meanings are processed will be understood by treating the high-lighted block in each of those drawings as representing the last of the predicates in the list of plural predicates in the relevant meaning. Thus, for example, the meaning of the word "turned" is:

past(_,1)
turn(1,2,3)

as can been seen from Table 1. The word "turned" is a past tense of the transitive verb "turn". The last predicate in the list for the meaning of "turned" is "turn(1,2,3)" and the argument numbers given in Table 2 and shown in FIG. 8 for transitive verbs should be taken as applying to the arguments of the predicate "turn(1,2,3)". As already noted when describing the lexicon, the insertion of the number "1" in the second argument of the predicate "past(_,1)" indicates that the value assigned to this argument will be the same as the value assigned to the first argument of the predicate "turn (1,2,3)". These comments apply to other categories of word whose meanings comprise more than one predicate.

Ambiguities

The preferred embodiment of the present invention is arranged for handling ambiguities of the kind which arise when a sentence, clause or phrase contains a word which can, as a result of the grammar, be taken as being linked to two or more other words in the sentence, clause or phrase giving rise to two or more different interpretations of that sentence, clause or phrase. In some cases the ambiguous link may be between a particular word and two or more preceding words in the sentence, clause or phrase. In other cases, the ambiguous link may arise between a particular word and two or more subsequent words in the sentence, clause or phrase. An example of the former ambiguous link has already been given in discussing the sentence "activate the camera on the third floor" ie. the word "on" is ambiguously linkable either to the word "activate" or the word "camera". An example of the latter is the sentence "activate the third camera switch". In this sentence, the word "third" could be read as qualifying the noun "switch" as a result of which the interpretation of the sentence would be "activate the third switch of the camera". Alternatively, the adjective "third" could be read as linked to or qualifying the word "camera" in which case the interpretation of the sentence would be "activate the switch of the third camera". Thus, some words ambiguously qualify preceding words and other words ambiguously qualify future words in the sentence, clause or phrase of which they form a part. Yet further words can be linked unambiguously to two or more other words. For example, in the sentence "the switch controls the camera" the transitive verb "controls" unambiguously qualify both to the noun "switch", which forms the subject of the verb, and the noun "camera" which forms the object of the verb.

The bindings discussed above are used for defining the ambiguities which are permitted. In particular, in the example "activate the camera on the third floor" and from consideration of Table 2C, it can be seen that the following binding defines the link between the meaning of the transitive verb "activate" and the meaning of the preposition "on":

909=901

It can also be seen that the following binding defines the link between the meaning of the noun "camera" and the meaning of the preposition "on":

909=907.

Thus, these two bindings together indicate the ambiguity since the value 909 which belongs to the word "on" is indicated as equated to, on the one hand, the value 901 which belongs to the word "activate" and, on the other hand, to the value 907 which belongs to the word "camera". For convenience, bindings referring to ambiguous links will be written as follows:

909=907,901.

Since some words can unambiguously qualify two or more other words, a means for distinguishing ambiguous bindings from unambiguous bindings is needed. In the present embodiment this is achieved by recording the common argument values of two or more bindings arising from ambiguities on the left-hand side of the bindings whereas common argument values (if any) on the right-hand side of bindings are indicative of there being no ambiguity. It can be seen that the two bindings 909=901 and 909=907 given above as examples follow this convention.

When designing a system according to the invention, it is thus possible to decide or determine in the grammar to be used which categories of word may qualify and/or be qualified by other categories of word and to assign accordingly an appropriate number of arguments to the meanings and to construct accordingly the instructions of Table 138 to ensure that undesired ambiguities are prevented and desired ambiguities are preserved and defined.

Example 1

The following example will more fully explain the operation of the analyser 128 and the building up of Table X.

In this Example, it is assumed that the lexicon is as set out in Table 1, Table 138 contains the data set out in Table 2 and the identifiers assigned to incoming words begin at the number 901. The way in which the input sentence "activate the camera on the third floor"

is processed will be described assuming that initially store 130 and sections 134, 140 and 142 of Table X have been cleared. It is also assumed that the computer 100 is arranged so that characters input via the keyboard 116 are stored in the input buffer 130 and that processing of the resulting words by the analyser module 128 is initiated by striking the conventional space bar on the keyboard.

The words are input in sequence beginning with the word "activate" and ending with the word "floor" via the keyboard 116. When the space bar is pressed, the analyser module 128 takes the first word "activate", accesses the lexicon 132 and stores the corresponding meaning in the current meaning section 134 in the form "activate (901,902,903)".

Analyser module 128 also accesses Table 138 to obtain instructions for dealing with transitive verbs. The third column of Table 2 indicates that three searches should be performed in search space 140, namely searches for the search codes "av", "auxv", and "n". However, the search space 140 is empty, the word "activate" being the first word input. The fourth column of Table 2 indicates that the search code "v" is to be associated with the value assigned to the first argument of the meaning of the transitive verb and that the search code "obj" is to be associated with the value of the third argument of the meaning of the transitive verb, and that these search codes and associated values should be stored in search space 140 after performance of the previously mentioned searches. Thus, after completion of those searches analyser module 128 inserts the data "v/901" and "obj/903" in search space 140. The fifth column of Table 2 indicates that if the search code "obj" had been found, that search code and its associated value would at this point be removed from the search space 140. At this point the contents of Table X are:

current meaning: activate(901,902,903)
search space: v/901 obj/903
bindings: NIL.

Having completed the above steps in relation to the word "activate", the analyser module 128 next processes the word "the". Lexicon 132 is accessed to obtain the meaning. It can be seen from Table 1 that the meaning of a determiner has two arguments and thus analyser 128 assigns to these arguments the next two numbers in the sequence of values, these being 904 and 905. Thus, the data "the (904,905)" is inserted in the current meaning section 134 of Table X.

Analyser module 128 also accesses Table 138. Table 2 shows that no searches for previous search codes in search space 140 are performed when processing determiners. However, the fourth column of Table 2 indicates that the search code "dn" together with the value assigned to the second argument of the meaning of the determiner should be stored in search space 140. Thus, the analyser module 128 stores the data "dn/905" in search space 140. The absence from the fifth column of Table 2 of any codes relating to determiners indicates that nothing should be removed from the search space 140 when a determiner is received. At this point the contents of Table X are:

current meaning: activate(901,902,903) the(904,905)
search space: dn/905 v/901 obj/903
bindings: NIL.

The analyser 128 next processes the word "camera". Lexicon 132 is accessed to obtain the meaning of the word "camera". Lexicon 132 indicates that "camera" is a noun and that the meaning of a noun is assigned two arguments. Analyser module 128 accordingly assigns the next two identifiers in the sequence, namely the numbers-906 and 907, to the first and second arguments of the meaning of "camera" and stores the data "camera(906,907)" in the current meaning section 134 of Table X.

The second column of Table 2 indicates that three searches of the search space 140 should be performed when a noun is received. The first search is for the search code "dn". Since the data "dn/905" was inserted in search space 140 when the determiner "the" was processed, this search will locate that code as a result of which analyser 128 will define a link between the meaning of the word "the" and the meaning of the word "camera". This link is defined by storing the binding 905=906 in section 142 of Table X. As indicated by the data in Table 2, this. binding is derived by taking the value (905) of the second argument of the meaning of the determiner and equating it to the first argument (906) of the meaning of the noun. The R indicates that the argument of the meaning of the noun should be placed on the right hand side of the equation which forms the binding. This search having found the code dn, is then terminated so that even if there were any further previous codes dn this search would not proceed to the stage at which they would be found.

The second search to be performed as a result of receipt of the noun "camera" is for the search code "an" in the search space 140. In this Example, such search code has not been inserted in search space 140 previously and thus the second search results in no further action.

The third search to be performed following receipt of the noun "camera" as indicated by Table 2 is for the search code "obj" in the search space 140. When the transitive verb "activate" was received, the data "obj/903" was inserted in search space 140 and accordingly this search locates this code. Analyser module 128 thus inserts the binding 903=907 in section 142 of Table X. This search is then terminated.

At this point, therefore, the contents of Table X are as follows:

| current meaning: | activate(901,902,903) |
| --- | --- |
| | the(904,905) |
| | camera(906,907) |
| search space: | n/907 |
| | dn/905 |
| | v/901 |
| | obj/903 |
| bindings: | 905=906 |
| | 903=907. |

The next word to be processed is the word "on". The analyser module 128 accesses the lexicon 132 which contains two occurrences of the word "on". Both are processed and the analyser module 128 is arranged to process in reverse order words which occur more than once in the lexicon.

The second occurrence of the word "on" in the lexicon is a preposition and its meaning is represented as "on(1,2,3)". Thus the analyser module 128 stores the data "on(908,909, 910)" in the current meaning section 134 of Table X.

The analyser module 128 then performs the first of the four searches indicated for prepositions in Table 2, namely a search of the search space 140 for the search code "p". In this Example, this search code has not been inserted in the search space 140 as a consequence of processing of any of the previous words.

Accordingly the second search is then performed for the search code "v". Since the data "v/901" was inserted in search space 140 when processing the transitive word "activate", this search locates the search code "v" in search space 140. The analyser module 128 then defines the link between the meaning of the transitive verb "activate" and the meaning of the word "on", by inserting the binding 909=901 in the section 142 of Table X.

The third search performed when the received word is a preposition is for the search code "n" in the search space 140. This search locates the data "n/907" which was inserted in the search space when processing the previous word "camera" which is a noun. The analyser module 128 has thus identified that the word "on" can either qualify the word "camera" or the word "activate". Linguistically, either possibility may be correct since, as already explained above, there is, upon linguistic analysis, an ambiguity in the sentence being processed. In the present embodiment, such ambiguities are represented in the bindings. Thus, at this point, the previously inserted binding 909=901 is modified to be 909=907,901, thus preserving the ambiguity which may be resolved in future processing.

The fourth search, for the code dn, is then performed. This search locates the entry "dn/905". However, an instruction represented by "x" is stored in Table 2 so that no binding is formed, it being arranged that x will be different from any value which can be assigned to any of the arguments during processing, and Table 2 indicates that the entry "dn/905" should at this point be removed from the search space.

At this point, therefore, the contents of Table X are as follows:

| | |
|---|---|
| current meaning: | activate(901,902,903) |
| | the(904,905) |
| | camera(906,907) |
| | on(908,909,910) |
| search space: | obj/910 |
| | p/908 |
| | n/907 |
| | v/901 |
| | obj/903 |
| bindings: | 905=906 |
| | 903=907 |
| | 909=907,901. |

The above processing of the word "on" is on the basis of the entry in the lexicon that that word is a preposition. The analyser module 128, having completed that processing, next processes the word "on" on the basis of the other entry in the lexicon, namely that it is an adverb.

From consideration of the above tables and the above description of the operation of the analyser module 128, it can be deduced that at completion of the processing of the word "on" on the basis that it is an adverb the contents of Table X will be:

| | |
|---|---|
| current meaning: | activate(901,902,903) |
| | the(904,905) |
| | camera(906,907) |
| | on(908,909,910) |
| | change-on(911,912) |
| search space: | av/912 |
| | obj/910 |
| | p/908 |
| | n/907 |
| | v/901 |
| | obj/903 |
| bindings: | 905=906 |
| | 903=907 |
| | 909=907,901 |
| | 912=901. |

Thus, the processing performed up to this point not only records and preserves the ambiguity arising from the question of whether the word "on" as a preposition should be read as qualify the word "camera" or the word "operate" but also records the fact that the word "on" might not be a preposition but might be an adverb in which case it would qualify only the word "activate". An important preferred aspect of the present invention is that all of these possibilities are at this stage preserved without the need for large memory space.

After the word "on" has been processed as described above, the next word "the" is processed. From consideration of the above description and tables, it can be deduced that at completion of the processing of the word "the", the contents of Table X are as follows:

| | |
|---|---|
| current meaning: | activate (901,902,903) |
| | the(904,905) |
| | camera(906,907) |
| | on(908,909,910) |
| | change-on(911,912) |
| | the(913,914) |
| search space: | dn/914 |
| | av/912 |
| | obj/910 |
| | p/908 |
| | n/907 |
| | v/901 |
| | obj/903 |
| bindings: | 905=906 |
| | 903=907 |
| | 909=907,901 |
| | 912=901. |

As can be seen from the above, although the data "dn/914" has been added to the search space, no binding has been inserted as a result of the processing of the word "the" since, as discussed previously, determiners do not initiate searching of the search space.

Processing of the word "third" results, as can be deduced from the above description and Tables, in the contents of Table X being as follows:

| | |
|---|---|
| current meaning: | activate(901,902,903) |
| | the(904,905) |
| | camera(906,907) |
| | on(908,909,910) |
| | change-on(911,912) |
| | the(913,914) |
| | third(915,916) |
| search space: | an/916 |
| | dn/914 |
| | av/912 |
| | obj/910 |

-continued

|  |  |
|---|---|
| bindings: | p/908<br>n/907<br>v/901<br>obj/903<br>905=906<br>903=907<br>909=907,901<br>912=901. |

Because the word "third" is treated as an adjective by this grammar, there is again no change in the list of bindings as no searching is performed. However, the processing of adjectives results in the search code an with the appropriate value being inserted in the search space.

Processing of the word "floor", which is the last word of the sentence, results in the contents of Table X being as follows:

COMPLETE TABLE X

| current meaning: | activate(901,902,903)<br>the(904,905)<br>camera(906,907)<br>on(908,909,910)<br>change-on(911,912)<br>the(913,914)<br>third(915,916)<br>floor(917,918) |
|---|---|
| search space: | n/918<br>an/916<br>dn/914<br>av/912<br>obj/910<br>p/908<br>n/907<br>v/901<br>obj/903 |
| bindings: | 905=906<br>903=907<br>909=907,901<br>912=901<br>914=917<br>916=918<br>910=918. |

As can be seen, the processing of the word "floor" resulted in three additional bindings being added to the bindings section 148 of space 136. This completes the building of Table X for the sentence "activate the camera on the third floor".

By way of summary the origin of the bindings in the bindings list is as follows:

1) The binding 905=906 has been defined as a result of the grammatical link between the first occurrence of the determiner "the" and the noun "camera" in the input sentence.
2) The binding 903=907 has been defined as a result of the grammatical link between the transitive verb "activate" and the noun "camera" in the input sentence.
3) The binding 909=906,901, which of course indicates an ambiguity, has been defined as a result of the ambiguous links between the word "on" considered as a preposition and the words "camera" and "activate" in the input sentence.
4) The binding 912=901 has been defined as a result of the possible grammatical link between the word "on" considered as an adverb and the transitive verb "activate" in the input sentence.
5) The binding 914=917 has been defined as a result of the grammatical link between the second occurrence of the determiner "the" and the noun "floor" in the input sentence.
6) The binding 916=918 has been defined as a result of the grammatical link between the adjective "third" and the noun "floor" in the input sentence.
7) The binding 910=918 has been defined as a result of the grammatical link between the word "on" considered as a preposition and the noun "floor" in the input sentence.

Execution of Bindings

The purpose of this step is to convert the data created in Table X from the form shown in which the word meanings (including their arguments) are listed separately from the bindings which define the links between the meanings into a form in which the arguments of the meanings indicate the links whilst nevertheless ensuring that ambiguities are preserved. To achieve this, the analyser module 128 takes each binding in turn and, provided the binding does not indicate an ambiguity, firstly, unifies the corresponding values in the current meaning section 134 by making the value in the current meaning list which corresponds to the right-hand side of the binding have a value the same as the value on the left hand side of the binding. In addition, the analyser module 128 searches the remaining bindings in bindings section 142 for any other binding which includes the same value as the right hand side of the binding currently being executed and changes such other value to a value corresponding to that of the left hand side of the binding being executed. In other words, if the binding a=b is being executed, all occurrences of the value "b" in the current meaning section 134 and the remaining bindings are changed to the value "a".

The analyser module 128 executes the remaining bindings one by one in the same way other than any bindings indicating ambiguities. This process will be more fully understood by consideration of the execution of the bindings of Example 1 above.

Thus, continuing with the description of Example 1 from the point at which Table X was completed as described above, in order to execute the bindings analyser module 128 takes the first binding from section 142 which in the above Example is 905=906, locates in the current meaning section 134 any occurrences of the value "906" and changes that value to the value "905". Thus, since in the above Example, the current meaning section contains the data "camera(906, 907)" this is changed to "camera (905,907)".

In addition, the analyser module 128 searches the remainder of the list of bindings (in this Example starting with the binding 903=907 and going through to the bottom of the binding list). Since there is no other occurrence of the value 906 in the bindings, no changes are made at this stage in this example in the binding list. Having completed processing of the first binding in the binding list, that binding is abandoned. Thus, at this point the contents of the current meaning section 134 and binding section 142 of Table X are as follows:

| current meaning: | activate(901,902,903)<br>the(904,905)<br>camera(905,907)<br>on(908,909,910)<br>change-on(911,912)<br>the(913,914)<br>third(915,916)<br>floor(917,918) |
|---|---|
| bindings: | 903=907<br>909=907,901 |

-continued

```
                    912=901
                    914=917
                    916=918
                    910=918.
```

After processing of the first binding of the list in this way, analyser module 128 processes the second binding in the same way, namely the binding 903=907. This processing results firstly in the data "camera(905,907)" currently in the current meaning section 134 being changed to "camera(905, 903)". There is no other occurrence of the binding 907 in the current meaning section 134. The analyser module then proceeds to unify the value 907 with the value 903 in all bindings so far unprocessed ie. starting with the binding 909=907,901, this thus being changed to 909=903,901. After processing the second binding, this is abandoned and the contents of the current meaning section and binding section of Table X are thus as follows:

```
    current meaning:        activate(901,902,903)
                            the(904,905)
                            camera(905,903)
                            on(908,909,910)
                            change-on(911,912)
                            the(913,914)
                            third(915,916)
                            floor(917,918)
    bindings:               909=903,901
                            912=901
                            914=917
                            916=918
                            910=918.
```

The next binding in the list is 909=903,901 (which in the original bindings list was 909=907,901) and this indicates an ambiguity. Bindings indicating ambiguities are not processed but are simply preserved in the bindings list and will be subject to any further unification which arises from execution of any subsequent bindings in the list.

Accordingly, the analyser module 128 takes the next binding in the list, which is 912=901, performs unification on both the current meaning list and the binding list as described above and then removes that binding from the bindings list, as a consequence of which steps the contents of the current meaning and binding sections of Table X become:

```
    current meaning:        activate(912,902,903)
                            the(904,905)
                            camera(905,903)
                            on(908,909,910)
                            change-on(911,912)
                            the(913,914)
                            third(915,916)
                            floor(917,918)
    bindings:               909=903,912
                            914=917
                            916=918
                            910=918.
```

After similar processing of the remaining three bindings, namely 914=917, 916=918 and 910=918, in turn as described above, the contents of the current meaning section and binding section of Table X become:

```
    current meaning:        activate(912,902,903)
                            the(904,905)
                            camera(905,903)
                            on(908,909,910)
                            change-on(911,912)
                            the(913,914)
                            third(915,916)
                            floor(917,918)
    bindings:               909=903,912.
```

At this point execution of the bindings is complete and the contents of the bindings section and current meanings section of Table X at this point are transferred to Table A, which, to make the position quite clear, thus contains the current meaning with identifiers unified to define links and a list of ambiguities which are represented by the bindings which indicate ambiguities, as follows:

TABLE A

```
    Current meaning:        activate(912,902,903)
                            the(904,905)
                            camera(905,903)
                            on(905,909,910)
                            change-on(911,912)
                            the(913,914)
                            third(915,910)
                            floor(914,910)
    Ambiguities:            909=903,912.
```

Incrementality

It will be understood from the above description that as each word is input, it is processed by the analyser module 128 without having to wait for all of the words in a group such as a phrase, clause or sentence to be received before any processing can start. It has been indicated above that, up to this point, it is assumed that each word is taken from the input buffer 130 in response to pressing of the space bar. It has also been assumed that, up to this point, the processing consists of, firstly, building up the lists of meanings in current meaning section 134 and the bindings in section 142 of memory area 136 and, secondly, execution of the bindings and that not until these two processes have been completed will any subsequent processing take place. It is practical for the invention to be arranged to operate in this way in the present embodiment. Preferably, a dialogue manager 160 included in the interface 126 is the means by which the analyser module 128 is activated to obtain the next word from the input buffer 130, the dialogue manager 160 thus being responsive to the pressing of the space bar. The dialogue manager 160 may also be responsive to the pressing of the return key and/or the full-stop (period) key for transferring the meanings and ambiguities from memory area 136 to Table 144, after which memory area 136 would be cleared to prepare it for the processing of a new group of words.

Although in the above description it has been assumed that the bindings are executed only after all of them in the current group of words have been formed, it is possible and in many cases will be preferable, in order to achieve maximum processing speed, for the bindings to be executed as they are formed and for the current meanings with the bindings executed to date to be passed on for further processing without waiting for receipt and processing of all of the words in the group. When this procedure is adopted, the subsequent processing may, at any given time, be operating on the basis of the current meaning to date but this may change as further words are processed. The possibility of such incremental operation is a significant advantage of the present invention.

Manipulation of Table 138

In the above description, it has been explained both in general terms and by way of specific example in Example 1 how that data in Table 138 (Table 2) is utilised to control the processing of signals derived from words input to the system through the keyboard in order to derive the bindings which are stored in section 142 of Table X dependent upon the grammar of the input language. The data in table 138 can be manipulated to take into account other grammars and/or to meet the needs of alternative applications of the invention.

For example, the data set out in Table 2 above is such that ambiguities may be defined if the current word is a preposition. These ambiguities are defined because, as shown in Table 2 above, when the current word is a preposition:

a) a search for the search codes stored in response to more than one previous word category takes place, in particular a search for the search codes stored in response to previous prepositions, previous auxiliary verbs, negatives, transitive verbs, "to verbs" and intransitive verbs and a search for search codes stored in response to previous nouns are all performed.

b) the characters 2 and L in the third and fourth columns respectively of Table 2 indicate that, firstly, the second argument of the meaning of the preposition is to be used for all bindings formed as a result of these searches and, secondly, the value of the second argument of the preposition is to be placed on the left-hand side of the bindings which, as explained above, indicates an ambiguity.

If, in any particular application of the invention, it were desired to prohibit the definition of bindings as a consequence of a link between a preposition and a preceding verb or preceding preposition, and only to permit bindings to be formed as a result of a link between the current preposition and a preceding noun, the two search instructions p and v could be omitted from the entries in column 2 of Table 2 relating to prepositions. Only a single search for the search code "n" would then be performed when a preposition is processed. Alternatively, if for some reason in a particular application of the invention it were desired to define unambiguous bindings between the meaning of a preposition and the meaning of a number of previous words of different categories, the instructions in Table 2 could be appropriately modified. One possible such modification would be to arrange that different arguments of the meaning of the preposition are used for the bindings defining links to previous word meanings of different categories. An alternative possible such modification would be to use the same argument of the meaning of the current preposition for defining bindings to two or more different categories of previous word meanings but rearrange the designations "L" and "R" in the table.

Thus, from the above explanation, the manner in which the data in Table 2 can be manipulated to provide for or prevent, as required, the possibility of defining ambiguous bindings between the meaning of a current word of a given category and the meaning of previous words will be understood.

The data in Table 2 can also be manipulated to provide for or prevent, as required, the possibility of bindings defining ambiguous links between a given word and two or more future words. For example, the data shown in Table 2 above permits the definition of ambiguous bindings between an adjective and two or more future nouns because each noun, as it is processed, causes a search for the search code "an" inserted in the search space 140 as a consequence of processing of any previous adjective. To prevent such ambiguous links, Table 2 could be modified by inserting the instruction an/2 in the fifth column of Table 2 in the line relating to nouns. In this way, if a noun were processed and the search locates the search code of the previous adjective, that search code would be disabled so that a binding relating to that previous adjective cannot be formed with any future further noun (or any other category of future word which, on receipt, might initiate a search for the search code of a previous adjective).

A form of ambiguity so far not discussed is that which may arise between just two words, for example, an adjective followed by a noun. For example, the phrase "good historian" could mean either a historian who is a good person or a person who is good at history. Table 2 may be manipulated to provide for the definition of such ambiguities. Such definition could be achieved by arranging that, when a noun is processed, if the search code "an" is found in the search, the resulting binding, instead of being made only with the second argument of the meaning of the noun, could be made both with the first argument and the second argument thereof. Since the result of this would be that the value associated with the stored search code "an" would be placed on the left of two bindings, one in which it is equated with the value of the first argument of the meaning of the noun and the other where it is equated with the value of the second argument of the meaning of the noun, an ambiguity would be defined in accordance with the convention described above.

Thus, the data in Table 2 can be manipulated to take into account the grammar of any language. Nevertheless, consideration of the grammar used in the illustrated embodiment of the invention will disclose that a complete grammar of the English language is not utilised but rather a simplified version of such grammar is employed. In fact, the complete grammar of a language such as English is extremely complex and it should, therefore, be understood that in practising the present invention it is not essential to take into account all of the complexities which would arise in a complete grammar but, as indeed illustrated by the preferred embodiment, simplified grammars can have considerable utility. The derivation of an embodiment of the invention which processes a language in accordance with more complex grammars, such as a more complete grammar of the English language, can nevertheless be achieved by manipulation of Table 2, if necessary after experimenting with various different possibilities.

Output Signal Generator

The output signal generator 124 comprises a reasoner module 146 which is operable to perform the following three steps:

1) To obtain the interpretations represented by the data stored in table 144, or each different interpretation of a given input sentence if there are ambiguities, and store those interpretations in a table 148;

2) Utilising rules stored in a table 150 of a knowledge base 152 and the interpretation stored in table 148, to derive a goal to be proved and store that goal in a table 154; and 3) To attempt to prove that goal utilising the facts contained in a table 156 of the knowledge base 152 and, if the goal can be proved, provide an appropriate output signal Xn:on or Xn:off to an output signal store 158.

Reasoner module 146 is called by the dialogue manager module 160 provided in the interface 126 which also communicates with the analyser module 128 and coordinates as necessary the operation of the analyser and reasoner modules 128 and 146.

The above three steps performed by the reasoner module 146 will be described in turn.

Reasoner Module 146—Step 1

As indicated, the first step performed by the reasoner module 146 is to obtain from table 144 the interpretation of the input instruction and to store that interpretation in table 148 for further processing. If there is only one interpretation ie. there are no ambiguities, this operation is a simple transfer of data from table 144 to table 148.

If there are ambiguities, the reasoner module 144 deals with the different possible interpretations separately and in turn. The first interpretation is obtained by taking the one of the possible equalities from the binding representing the ambiguity, corresponding the unifying the identifiers in the arguments stored in table 144 and then storing the resulting interpretation in table 148. Thus, taking the data of Example 1 as shown in Table A above, one of the equalities represented by the ambiguity:

909=903,912 is

909=912 and unification is performed by replacing any occurrence of the identifier 912 in the arguments of the current meaning by the identifier 909. Thus, in Example 1, the data written into table 148 is as set out below in Table B(1). This is processed before taking the next interpretation represented by the ambiguities stored in Table 144.

Again referring to Table A above, the other equality represented by the ambiguity:

909=903,902 is

909=903.

When the interpretation represented by this equality is to be processed, unification is performed by replacing any occurrence of the identifier 903 in the arguments of the current meaning by the identifier 909 and thus, in Example 1, the data written into table 148 is as set out below in Table B(2).

TABLE B(1)

operate(909,902,903)
the(904,905)
camera(905,903)
on(908,909,910)
on(911,909)
the(913,914)
third(915,910)
floor(914,910)

TABLE B(2)

operate(912,902,909)
the(904,905)
camera(905,909)
on(908,909,910)
on(911,912)
the(913,914)

TABLE B(2)-continued third(915,910)
floor(914,910)

As already indicated, in the present embodiment, the interpretation represented by the data set out in Table B(2) is not processed until processing of the interpretation represented by the data in Table B(1) has been completed. However, for convenience, both interpretations have been set out at this time.

For ease of understanding, Steps 2 and 3 which are performed by the output signal generator 124 as indicated above will both be described in general terms before describing the performance of these two steps in full detail.

Step 2—Description in General Terms

In Step 2, the reasoner module 146 takes the interpretation currently in Table 148 and, applying to it rules obtained from Table 150, converts that interpretation into a goal and stores the goal in Table 154 so the goal may thereafter be proved as already mentioned. Table 150 is therefore in the form of a look-up table and contains an entry for each of the entries relevant to this embodiment in the meanings stored in lexicon 132. For each such entry in the Table 150, that table also includes data indicating the processing to be performed in relation to that entry to convert the interpretation in Table 148 into the form of a goal to be stored in Table 154.

In the present embodiment, the action which is to be performed is the turning on or turning off of a switch. Which of the switches is to be acted upon is determined by the interpretation derived from the input sentence.

The contents of Table 150 for the present embodiment are as set out below in Table 3:

TABLE 3

| KNOWLEDGE BASE RULES | | |
|---|---|---|
| on(e,x,y) | location(x,y) | |
| change-on(x,e) | | e=s:on |
| change-off(x,_:off) | | e=s:off |
| activate(e,x,y) | action(e) | e=s:on |
| | switch(y,s) | |
| switch(e,x,y) | action(e) | e=s: |
| | switch(y,s) | |
| illuminate(e,x,y) | action(e) | e=ls:on |
| | light(l) | |
| | main(l) | |
| | location(l,y) | |
| | switch(y,ls) | |
| extinguish(e,x,y) | action(e) | e=ls:off |
| | light(y) | |
| | switch(y,ls) | |
| show(e,x,y) | action(e) | e=(cs+ls):on |
| | camera(c) | |
| | location(c,y) | |
| | light(l) | |
| | main(l) | |
| | location(l,y) | |
| | switch(c,cs) | |
| | switch(l,ls) | |
| show(e,x,y) | action((cs+ls):e) | e=(cs+ls):on |
| | location(y,p) | |
| | camera(c) | |
| | location(c,p) | |
| | light(l) | |
| | main(l) | |
| | location(l,p) | |
| | switch(c,cs) | |
| | switch(l,ls) | |

TABLE 3-continued

KNOWLEDGE BASE RULES

| | | |
|---|---|---|
| camera(x,y) | camera(y) | |
| light(x,y) | light(y) | |
| floor(x,y) | floor(y) | |
| first(x,y) | first(y) | |
| second(x,y) | second(y) | |
| third(x,y) | third(y) | |
| on(e,x,y) | location(x,y) | |
| lock(e,x,y) | action(e) | e=s:on |
| | lock(l,y) | |
| | switch(l,s) | |
| unlock(e,x,y) | action(e) | e=s:off |
| | lock(l,y) | |
| | switch(l,s) | |
| lock(e,x,y) | action(e) | e=s:on |
| | location(o,y) | |
| | lock(l,o) | |
| | switch(l,s) | |
| unlock(e,x,y) | action(e) | e=s:off |
| | location(o,y) | |
| | lock(l,o) | |
| | switch(l,s) | |
| lock(e,x,y) | action(e) | e=s:on |
| | lock(y,o) | |
| | switch(y,s) | |
| unlock(e,x,y) | action(e) | e=s:off |
| | lock(y) | |
| | switch(y,s) | |
| open(e,x,y) | unlock(e,x,y) | |
| close(e,x,y) | lock(e,x,y) | |
| secure(e,x,y) | lock(e,x,y) | |
| change(e,x,y) | switch(e,x,y) | |
| cut(e,x,y) | extinguish(e,x,y) | |
| lighting(x,y) | light(x,y) | |
| door(x,y) | door(y) | |
| front(x,y) | front(y) | |
| rear(x,y) | rear(y) | |
| sensor(x,y) | sensor(y) | |
| alarm(x,y) | sensor(y) | |
| infrared(x,y) | infrared(y) | |
| motion(x,y) | motion(y) | |
| main(x,y) | main(y) | |
| backup(x,y) | backup(y) | |

The left-hand column of Table 3 lists the relevant meanings from the right-hand column of the lexicon, Table 1, the middle column of Table 3 lists the goals which correspond to those meanings and the third column of Table 3, indicates whether any action to be performed is a switching on or a switching off.

The reasoner module 146 applies each item from the current interpretation in Table 148 in turn to the data shown in the left-hand column of Table 3 to obtain from the middle column the corresponding goals and, in the relevant cases, to obtain from the right-hand column the instruction as to whether the action to be taken is switching on or switching off. Although the order in which the items of Table 148 are applied to Table 150 is irrelevant to the operation of the preferred embodiment, the processing of the meanings of verbs will be described first for ease of understanding.

As can be seen from inspection of Table 3 above, each of the verb meanings shown in the left-hand column has associated with it in the middle column a goal labelled "Action" and a further goal labelled "Switch". A number of the verb meanings have a number of other goals associated with them in addition. The goals labelled "Action" are used for defining the action to be performed ie. whether it is the action of switching on or switching off a switch. The goals labelled "Switch" are used for identifying which of the switches X1 to X21 is to be acted upon. The goal to be proved which is supplied to Table 154 after processing of the interpretation against the rules of Table 150 will be considered in this description as being in the form of a rule which is either:

action(Xn:on) if . . .

or action(Xn:off) if . . .

with the right-hand side of the rule comprising a set of sub-goals inter-related in a manner dependent upon the bindings which were formed during processing by the input signal processor 122. These sub-goals consist of the sub-goals associated with the relevant verb meaning as set out in the middle column of Table 3 plus sub-goals derived by applying the meanings of non-verbs of Table B to Table 3. The creation of the rule with its sub-goals using Table 3 also involves an instantiation of variables which will be described later. If the sub-goals forming the right-hand side of these rules can be proved against the facts contained in table 156 of the knowledge base 152 (which proving operation involves a further instantiation which will be described later), the appropriate signal Xn:on or Xn:off will be generated. If any one of the sub-goals cannot be proved, then an output signal will not be generated. The failure to prove the sub-goals indicates that the interpretation being processed is an incorrect interpretation of the input instruction for the situation described by the knowledge base.

Step 3—General Description

In the present embodiment, the facts stored in table 156 of the knowledge base 152 are as represented in the following Table 4:

TABLE 4

KNOWLEDGE BASE FACTS

| | | |
|---|---|---|
| camera(C1) | camera(C2). | camera(C3). |
| location(C1, F1). | location(C2, F2). | location(C3, F3). |
| switch(C1, X1). | switch(C2, X2). | switch(C3, X3). |
| light(L1). | light(L2). | light(L3). |
| main(L1). | main(L2). | main(L3). |
| location(L1, F1). | location(L2, F2). | location(L3, F3). |
| switch(L1, X4). | switch(L2, X5). | switch(L3, X6). |
| light(L4). | light(L5). | light(L6). |
| backup(L4). | backup(L5). | backup(L6). |
| location(L4, F1). | location(LS, F2). | location(L6, F3). |
| switch(L4, X7). | switch(L5, X8). | switch(L6, X9). |
| sensor(S1). | sensor(S2). | sensor(S3). |
| infrared(.S1). | infrared(S2). | infrared(S3). |
| location(S1, F1). | location(S2, F2). | location(S3, F3). |
| switch(S1, X10). | switch(S2, X11). | switch(S3, X12). |
| sensor(S4). | sensor(S5). | sensor(S6). |
| motion(54). | motion(S5). | motion(S6). |
| location(S4, F1). | location(S5, F2). | location(S6, F3). |
| switch(S4, X13). | switch(S5, X14). | switch(S6, X15). |
| door(D1). | door(D2). | door(D3). |
| front(D1). | front(D2). | front(D3). |
| location(D1, F1.). | location(D2, F2). | location(D3, F3). |
| lock(K1, D1). | lock(K2, D2). | lock(K13, D3). |
| switch(K1, X16). | switch(K2, X17). | switch(K3, X18). |
| door(D4). | door(D5). | door(D6). |
| rear(D4). | rear(D5). | rear(D6). |
| location(D4, F1). | location(D5, F2). | location(D6, F3). |
| lock(K4, D4). | lock(K5, D5). | lock(K6, D6). |
| switch(K4, X19). | switch(K5, X20). | switch(K6, X21). |
| floor(F1). | floor(F2). | floor(F3). |
| first(F1). | second(F2). | third(F3). |
| person(P1). | person(P2). | person(P3). |
| location(P1, F1). | location(P2, F2). | location(P3, F3). |
| camera(C1). | carmera(C2). | camera(C3). |
| location(C1, F1) | location(C2, F2). | location(C3, F3). |
| switch(C1, X1). | switch(C2, X2). | switch(C3, X3). |
| monday(day1). | tuesday(day2). | wednesday(day3). |
| thursday(day4). | friday(day5). | saturday(day6). |
| sunday(day7). | | |

For convenience of description, the data in Table 4 is divided into three sections. The first section, as seen, consists of twenty-one groups of data related respectively to the switches X1 to X21 and the devices which they control. The second section of Table 4 contains data relating to the three floors. The third section contains data relating to time. All of the above data is represented as predicates and their arguments.

From inspection of the second part of Table 4 above, it can be seen that the arguments of the predicates relating to the three floors are given as F1, F2 and F3 and, taking this into account, it can be appreciated from consideration of, for example, the group of data in the first part of the Table relating to camera C3 that the camera is defined by the value C3, its location is defined by the value F3 (the third floor) and it is controlled by the switch identified by the value X3 (ie. switch X3).

It can further be appreciated that if the rule stored in table 154 can be proved against the facts in table 156 in the form:

action(X3:on) if: camera(C3)
location (C3,F3)
switch(C3,X3)
floor(F3)
third(F3)

then the output signal X3:on can be generated.

As will become apparent from the detailed description of Steps 2 and 3 performed by the reasoner 146, the rule will be proved in this form in Example 1 when the interpretation of the instruction "activate the camera on the third floor" is taken as being "switch on the switch of the camera on the third floor", but the rule which will be stored in table 154 if this instruction is interpreted as being "switch on the switch, which is on the third floor, of the camera" will not result in the output of any switching signal since that rule is unprovable against the facts in the knowledge base.

The manner in which the rules stored in table 154 are derived for each interpretation and the manner in which those rules are proved against the facts in table 156 will now be described in detail and by way of example.

Application of the data in Table B(1) to the data in Table 3 and processing thereof by the reasoner module 146 converts the data in Table B(1) to the form set out below in Table C(1):

TABLE C(1)

action(s:on)
switch(903,s)
camera(903)
location(s:on,910)
third(910)
floor(910)

This data of Table C(1), which, as will already be apparent from the foregoing description, is inserted in table 154 and is derived as follows: first the entry "activate(909,902,903)" of Table B(1) is applied to look-up Table 3. A match with the entry "activate (e,x,y)" in the left-hand column is found. The arguments "e,x,y" of the entry "activate(e,x,y)" of Table 3 are instantiated with the arguments "(909,902,903)" of the data being processed from Table B(1). Thus, e is made equal to 909, x is made equal to 902 and y is made equal to 903. The corresponding goals from the middle column of Table 3, namely "action(e)" and "switch(y,s)" are extracted and the variables thereof instantiated so far as possible with the values of e, x and y as given above. Thus, the data extracted from the middle column of Table 3 becomes:

action(909)
switch(903,s).

The data in the third column of Table 3, namely "e=s:on", relating to the entry "activate(e,x,y)" is also extracted and instantiation performed so that e=s:on
becomes
909=s:on and the data extracted from the middle column is then further instantiated with the above to become:

action(s:on)
switch(903,s).

A similar instantiation of the variable 909 will be made by the system for any further occurrences of the variable 909 in the data in Table B(1) as that data is processed.

This completes the processing of the first entry in Table B(1) and that is stored in table 154.

The next entry in Table B(1) is "the(904,905)". In the present embodiment the meanings of determiners are ignored at this point, there being no corresponding entry in Table 3.

The next entry in Table B(1) is "camera(905,903)". This is applied to look-up Table 3 and the entry "camera (x,y)" is located and the corresponding goal "camera(y)" extracted from the middle column of Table 3. The arguments x and y of the predicate camera in the left-hand column of Table 3 indicate that the variables x and y (if any) of the data extracted from the middle column of Table 3 are to be instantiated respectively with the first and second variables of the entry from Table B(1) being processed. Since the data extracted from the middle column of Table 3 is "camera (y)" this is converted to:

camera(903)

and stored in Table 154. Thus, at this point, the contents of table 154 are:

action(s:on)
switch(903,s)
camera(903).

The next entry in Table B(1) is then taken and applied to the first column of Table 3. This is "on(908,909,910)". This is matched with the corresponding entry "on(e,x,y)" in the left-hand column of Table 3. The corresponding data, namely "location(x,y)", is then extracted from Table 3 and instantiation performed between the variables x,y of that data and the second and third variables of the entry from Table B(1) being processed. Thus, x is made equal to 909, and y is made equal to 910. However, as already mentioned, when the first entry from Table B(1) was processed 909 was instantiated with s:on and thus the data "location(x,y) extracted from the middle column of Table 3 is converted to:

location(s:on,910).

This is added to table 154, the contents of which thus become:

action(s:on)
switch(903,s)
camera(903)
location(s:on,910).

The next entry from Table B(1) is again processed, namely "change-on(911,909)". This is matched with the entry "change-on(x,e)" in the left-hand column of Table 3 but, as seen from Table 3, there is no data in the middle column for extraction, corresponding to this entry. There is, however, an instantiation indicated in the third column, namely:

e=s:on.

After instantiation, this becomes:

909=s:on which is the same as the previous instantiation of 909 and this thus has no effect in the present example. However, other examples could arise in which this would have an effect. An example in which such an effect arises will be given later.

The next entry in Table B(1) is a further occurrence of "the". As indicated previously, the attempt to match this with an entry in the left-hand column of Table 3 fails and thus the meaning of the determiner, in this example, is again ignored.

The next entry in Table B(1) is "third(915,910)". This is matched with the entry "third(x,y)" in the left-hand column of Table 3 and as a consequence the corresponding data "third(y)" is extracted from the middle column and the variable "y" instantiated with the second variable of the entry "third(915,910)" which is being processed.

Thus, the data "third(910)" is added to the contents of table 154, which thus become:

action(s:on)
switch(903,s)
camera(903)
location(s:on,910)
third(910).

The final entry in Table B(1) is "floor(914,910)". This is matched with the entry "floor(x,y)" in the left-hand column of Table 3 and, as will now be apparent, the data "floor(y)" is extracted from the middle column, instantiation performed between the variable "y" and the second argument of the entry of Table B(1) being processed as a result of which the data "floor(910)" is added to table 154. The contents of that table thus become as set out in Table C above, namely:

action(s:on)
switch(903,s)
camera(903)
location(s:on,910)
third(910)
floor(910).

It has already been explained that the data inserted into table 154 is treated as a goal to be proved against the facts in table 156. Thus, the data of Table C(1) may be considered as rewritten as follows:

| action(s:on) if: | switch(903,s) |
| | camera(903) |
| | location(s:on,910) |
| | third(910) |
| | floor(910). |

An attempt to prove the sub-goals on the right-hand side of this rule is then made by applying the sub-goals in turn to the facts in table 156 of the knowledge base 152, performing instantiation as appropriate when a corresponding fact is found.

Assuming that the sub-goal "switch(903,s)" is processed first, it will firstly be appreciated that there are twenty-one entries in Table 4 with which the sub-goal may be matched. The proving operation involves, as already indicated, instantiation with the first match which is found and then proceeding to try to prove the remaining goals performing instantiation as appropriate. As will be appreciated by those skilled in the art, when an instantiation is performed upon the finding of a match in the facts of the knowledge base, all occurrences of the variables in question are instantiated in the same way in the goals to be proved. For the purpose of illustration, it will be assumed that firstly or at some point, the sub-goal "switch(903,s)" is matched with the entry "switch(C3,X3) in Table 4). Upon finding this match, the variables "(903,s)" of the sub-goal being proved are instantiated with the constants "(C3,X3)" throughout the data currently stored in table 154, which thus becomes (expressed as a rule):

| action(X3:on) if: | switch(C3,X3) |
| | camera C3) |
| | location(X3:on,910) |
| | third(910) |
| | floor(910). |

As seen in the above rule, instantiation has been performed throughout where possible.

Next, the goal "camera(C3)" obtained from the contents of table 154 as thus modified is applied for proof to the facts in Table 4. As can readily be seen, this goal matches with the entry "camera(C3)" and thus the goal is proved with no instantiation being performed.

The next sub-goal to be proved is "location(X3:on,910), this again being obtained from table 154 as modified by the previous instantiation. As can be seen from inspection of Table 4, there is no entry with which the sub-goal "location (X3:on,910)" can be matched. This is because the argument "X3:on" is no longer a variable but a constant due to the previous instantiation.

At this point, therefore, the proof fails and no output signal is generated. This of course is correct since, as will already be apparent from the foregoing description, the interpretation of Table B(1) is an incorrect interpretation of the instruction "activate the camera on the third floor".

The reasoner module 146 thus now proceeds to process the interpretation set out in Table B(2). Consideration of the data in Table B(2) and the foregoing description of the manner in which the contents of table 154 are derived by processing with respect to the contents of table 150 will disclose that, upon completion of processing Table B(2), the reasoner module 146 will have inserted into table 154 data as represented in the following Table C(2):

TABLE C(2)

action(s:on)
switch(909,s)
camera(909)
location(909,910)
third(910)
floor(910)

As previously indicated, this is treated as a rule as follows:

| action(s:on) if: | switch(909,s) |
| | camera(909) |
| | location(909,910) |
| | third(910) |
| | floor(910). |

Assuming that the first sub-goal to be processed against the facts in Table 4 is "switch(909,s) and that, at some point, the match with the fact "switch(C3,X3)" is found, the variable "909" is changed to C3 and the variable "s" is changed to "X3", this instantiation being effected throughout the contents of table 154 which thus become (expressed as a rule):

```
action(X3:on) if:      switch(C3,X3)
                       camera(C3)
                       location(C3,910)
                       third(910)
                       floor(910).
```

The next sub-goal to be processed is "camera(C3)", this being obtained from the contents of table 154 as modified after the previous instantiation. As can be seen from inspection of Table 4 this can be proved by a match with the corresponding entry "camera(C3)" in that Table and no instantiation takes place. Thus, the contents of table 154 do not change at this point.

The next goal to be processed is "location(C3,910)". Assuming that at some point this sub-goal is matched with the entry "location(C3,F3)", instantiation of the variable "910" with the constant "F3" is performed, and this is performed throughout the contents of table 154 which thus becomes (expressed as a rule):

```
action(X3:on) if:      switch(C3,X3)
                       camera(C3)
                       location(C3,F3)
                       third(F3)
                       floor(F3).
```

The remaining two goals, namely "third(F3)" and "floor(F3)" are then proved in turn against the facts in knowledge base 156 and as seen these can be matched with the corresponding entries therein. Thus, in this example, the goal action(x3:on)

is proved and reasoner module 146 supplies the signal "X3:on" to the output signal 158, from which it is broadcast via the interface 102 to the network 104, and received by the switch X3 which thus turns on the camera C3 on the third floor.

From the above description, it will be understood that, in the embodiment illustrated in the drawings, it is necessary that Tables 2, 3 and 4 are set up so that the instantiations which take place when accessing Tables 3 and 4 are correctly related to the different arguments of the meanings in the lexicon when producing the interpretation or interpretations of the input sentence using Tables 1 and 2. In designing a system according to the embodiment of the invention as illustrated in the drawings, therefore, it is necessary, having decided upon the contents of Table 2 for the particular application, to make the instructions of Table 3 and the facts and their arguments set out in Table 4 fully consistent with each other. Such consistency, whereby the interpretation set out in B(1) correctly fails whereas the interpretation set out in Table B(2) correctly succeeds in the production of an output signal can be seen from the following tabular summaries of the processing of these two interpretations by the output signal generator:

TABULAR SUMMARY I

| FROM TABLE B(1) | LEFT-HAND COLUMN OF TABLE 3 | TABLE C(1) | NO PROOF AGAINST TABLE 4 |
|---|---|---|---|
| activate(909, 902, 903) | activate(e, x, y) | action(s:on) | action(x3:on) |
| camera(905, 903) | camera(x, y) | switch(903, s) | switch(c3, x3) |
| on(908, 909, 910) | on(e, x, y) | camera(903) | camera(c3) |
| third(915, 910) | third(x, y) | location(s:on, 910) | No Match |
| floor(914, 910) | floor(x, y) | third(910) | third(F3) |
|  |  | floor(910) | floor(F3) |

TABULAR SUMMARY II

| FROM TABLE B(2) | LEFT-HAND COLUMN OF TABLE 3 | TABLE C(2) | PROOF FROM TABLE 4 |
|---|---|---|---|
| activate(912, 902, 909) | activate(e, x, y): | action(s:on) | action(X3:on) |
| camera(905, 909) | camera(x, y) | switch(909, s) | switch(C3, X3) |
| on(908, 909, 910) | on(e, x, y) | camera(909) | camera(C3) |
| third(915, 910) | third(x, y) | location(909, 910) | location(C3, F3) |
| floor(914, 910) | floor(x, y) | third(910) | third(F3) |
|  |  | floor(910) | floor(F3) |

As will already be clear, the two different forms of processing represented in the above two tabular summaries arise from ambiguity as to whether the preposition "on" in the input instruction qualifies the transitive verb "activate" or the noun "camera", the possibilities of ambiguities of this type arising being provided for in the processing defined by Table 2. As can be seen from FIG. 4, the second argument of the meaning of a preposition can form a binding with the first argument of the meaning of a transitive verb or the second argument of the meaning of a noun. The values 909 in the first argument of the predicate "activate" and the second argument of the predicate "on" in the column of the first of the above tabular summaries labelled "from Table B(1)" indicates that in that interpretation the preposition "on" in the input instruction is taken as qualifying the transitive verb "activate" and the subsequent processing represented in the first of the above tabular summaries shows how such an interpretation of the instruction is inconsistent with the data in the knowledge base.

A similar consideration of the second of the above tabular summaries and FIG. 4 shows how the value 909 in the second argument of the predicate "camera" and in the third argument of the predicate "on" is indicative of the preposition "on" in the input instruction qualifying the preceding data in table 144 (corresponding to Table A) (using the notation of Example 1):

show(901,902,903)
the(904,908))
third(906,903)
floor(908,903).

There are no ambiguities. Reasoner 146, therefore simply transfers the single interpretation of table 144 into table 148 (corresponding to Table B) and derives from this and from table 150 a goal to be proved which is inserted in table 154 (corresponding to Table C) and then proceeds to prove the sub-goals thereof against the facts in knowledge base 156. These processes are summarised in the following Tabular Summary III:

TABULAR SUMMARY III

| FROM TABLE 148 | LEFT-HAND COLUMN OF TABLE 3 | TO TABLE 154 | PROOF FROM TABLE 156 |
|---|---|---|---|
| show(901, 902, 903) | show(e, x, y) | action(cs + ls:on) camera(c) location(c, 903) light(1) main(1) location(1, 903) | action(X3 + X6:on): camera(C3) location(C3, F3) light(L3) main(L3) location(L3, F3) |
| switch(c, cs) switch(l, ls) third(906, 903) floor(908, 903) | switch(C3, X3) switch(L3, X6) third x, y) floor(x, y) | third(903) floor(903) | third(F3) floor(F3) | noun "camera". Consideration of the remainder of the second of the above tabular summaries and of the facts stored in the knowledge base will show how this interpretation is consistent with the facts stored in the knowledge base and can thus result in the production of an output signal.

When constructing a signal generator for processing the output signals produced by an input signal processor in accordance with the invention, it is necessary to ensure that the output signal generator should be constructed in a manner such that the signals from the input signal processor can be interpreted and processed in a manner such that the desired results are obtained.

Alternative Forms of Instruction

Example 1 above is based upon processing the instruction "activate the camera on the third floor" but, as indicated, alternative forms of an instruction which will result in activation of the camera on the third floor are "observe the third floor" and "watch the people on the third floor".

Processing of the instruction "observe the third floor" by the input signal processor 122 will provide the following The instruction "watch the people on the third floor" involves much more processing since the input signal processor 122 provides to table 144 output data representing a number of ambiguities, as follows:

show(914,902,903)
the(904,905)
several(906,905)
person(905,909)
on(910,911,912)
change-on(913,914)
the(915,916)
third(917,912)
floor(916,912)
911=903,914.

The following tabular summary IV represents the instruction "watch the people on the third floor" and is selected to illustrate that interpretation which results in the production of an output signal, this instruction having many other interpretations also which would not result in an output signal being produced. Those other interpretations can be considered by working through the example with the assistance of the foregoing description.

TABULAR SUMMARY IV

| FROM TABLE 148 | LEFT-HAND COLUMN OF TABLE 3 | TO TABLE 154 | PROOF FROM TABLE 156 |
|---|---|---|---|
| show(914, 902, 911) | show(e, x, y) | action((cs + 1s)on) location(911, p) | action((X3 + x6):on) location(P3, F3) |

-continued

TABULAR SUMMARY IV

| FROM TABLE 148 | LEFT-HAND COLUMN OF TABLE 3 | TO TABLE 154 | PROOF FROM TABLE 156 |
| --- | --- | --- | --- |
| | | camera(c) | camera(C3) |
| | | location(c, p) | location(C3, P3) |
| | | light(1) | light(L3) |
| | | main(1) | main(L3) |
| | | location(1, p) | location(L3, F3) |
| | | switch(c, cs) | switch(C3, X3) |

TABULAR SUMMARY IV

| FROM TABLE 148 | LEFT-HAND COLUMN OF TABLE 3 | TO TABLE 154 | PROOF FROM TABLE 156 |
| --- | --- | --- | --- |
| | | switch(1, 1s) | switch(L3, X6) |
| person(905, 911) | person(x) | person(911) | person(P3) |
| on(910, 911, 912) | on(e, x, y) | location(911, 912) | location(P3, F3) |
| change-on(913, 914) | change-on(x, e) | | |
| third(917, 912) | third(x) | third(912) | third(F3) |
| floor(919, 912) | floor(x) | floor(912) | floor(F3) |

Alternatives and Modifications

Numerous modifications can be made in the invention as described above and the invention has wide application. A number of possible modifications and alternative applications will be mentioned below that such description is not exhaustive. Although the embodiment illustrated in the drawings has been described as having a knowledge base having a set of facts which do not change during the operation of the apparatus, those facts being set out in Table 4 above, it is possible to apply the invention to systems in which the fact in the knowledge base changes as the system is operated. One possibility is to utilise an abductive reasoner instead of the deductive prover which has been described. Another is to provide means which modifies the knowledge base to take into account changing circumstances. For example, in the embodiment illustrated with reference to the drawings, signals for switching the switches X1 to X21 on or off are generated, in response to appropriate input instructions, regardless of the current status of those switches. Means could be provided for inserting into the knowledge base, each time a switch changes state, a fact indicating the current state of the switches and for inhibiting the broadcast of any signal instructing the switch to be switched to the state that it is already in. This is achievable by storing in the knowledge base, for each switch Xn, the fact currently(Xn:off)

or currently(Xn:on).

The reasoner module 146 would, in this modification, after proving the goal action(Xn:on) or action(Xn:off) before generating the output signal, check the knowledge base and only generate the output signal if the status of the switch to be switched is currently the opposite of that instructed.

As described in detail above, the lexicon set out in Table 1 includes a first column containing all of the input words which the illustrated embodiment is intended to process and a third column indicating the meanings of those words. Further, the first and second columns of Table 3 are structured to provide, for a number of the meanings derived from Table 1, a translation into a number of different goals or sub-goals. For example, the meaning "activate(1,2,3)" obtained from Table 1 is translated to "action(e)" and "switch(y,s)", and the meaning "extinguish" is translated to "action(e), light (y), switch(y,ls)". It would be possible within the scope of the invention for some or all of this translation to be performed by means of the lexicon. This would involve appropriate enlargement or modification of the meanings in the third column of Table 1. For example, Table 3 as structured above includes translations of the words:

| | |
| --- | --- |
| open | to unlock |
| close | to lock |
| secure | to lock |
| change | to switch |
| cut | to extinguish |
| lighting | to light | but it would be equally possible to provide these translations in Table 1 thus avoiding the need to provide them in Table 3.

Although in the embodiment described in detail above, separate tables 132 and 138 have been provided respectively for the lexicon, indicating for each input word its category and meaning, and Table 2 indicating instructions for dealing with each category, it is possible within the scope of the invention to combine the data in these two tables into a single table. In this case, the middle column of Table 1 could be replaced by the instructions of Table 2.

Although, for the purpose of illustrating the invention, a relatively simple application has been chosen for the embodiment in which switches in a building are controlled, the invention in fact has wide application and is useful for much more complex operations. It can be used for controlling any kind of switching, for example in manufacturing processes controlled by computer, and for dealing with instructions for controlling computer systems themselves, for example, searching data bases or for translation from one natural language to another. Thus, the signal processes according to the invention, for receiving instructions or information in a natural or other language and deriving therefrom output signals in a form useful for further processing, can be applied to any situation in which it is desired to derive control signals in response to input signal derived from a natural or other language input. Thus, the output signal generator can be replaced with any device or system which is adapted to respond to signals from the input signal processor and produce useful output signals therefrom for supply to a further device, system, apparatus or program module. Such output signals will be referred to herein as "control" signals but it should be understood that such expression is intended to have broad scope. Thus, a signal processor according to the invention may form a component of any of a wide variety of systems.

Although the embodiment of the invention illustrated has utilised the English language for the instructions to be input, embodiments of the invention may be constructed to operate with other languages including languages in which words as such are not employed. An example of such a language is Japanese when written with Kanji or Kana characters.

Although the invention is conveniently implemented by software, for example, utilising the language prolog, other languages may be utilised for implementing the invention and, further, the invention may be implemented partly or completely by hardware and/or so-called firmware. For example, the contents of Tables 1 and 2 could, instead of being implemented by software, be stored in ROM or could be implemented by hardwire digital circuitry although in the latter case, the system would be much more complex.

I claim:

1. A natural language interface to a computer which generates data structured in computer usable form and derived from input data in the form of word units in the natural language, said word units comprised of a plurality of different lexical categories, said interface comprising:
   (a) first defining means for defining the word units of said natural language which may be processed by the interface;
   (b) data unit generating means for generating computer usable data units in response to input of said word units of said natural language, wherein different data units are generated for different word units of said natural language;
   (c) second defining means for defining a plurality of different search codes;
   (d) selecting means for selecting, in response to input of word units of at least some of said lexical categories, search codes from said plurality of different search codes, the selected search codes being selected based on the lexical category of the input word unit, the selected search codes being usable to generate links only between the data unit generated by said generating means in response to input of the current word unit and one or more subsequently generated data units;
   (e) searching means for searching, in response to input of word units in at least some of said lexical categories, for predetermined search codes which have been previously selected, the predetermined search codes being dependent upon the lexical category of the word unit; and
   (f) link generating means responsive to said predetermined search codes being found by said searching means for generating links between data units to provide said data structured in computer usable form.

2. A natural language interface according to claim 1, wherein said data unit generating means comprises a lexicon and means for accessing said lexicon to obtain therefrom both the lexical category of the word units and said data units.

3. A natural language interface according to claim 1, wherein said selecting means is operable to select exactly one of said search codes in response to input word units of at least one of said lexical categories.

4. A natural language interface according to claim 1, wherein said selecting means is operable to select a plurality of different search codes in response to input word units of at least one of said lexical categories.

5. A natural language interface according to claim 1, wherein said searching means is operable to perform no search for said predetermined search codes in response to input word units of at least one of said lexical categories.

6. A natural language interface according to claim 1, wherein said searching means is operable to perform a search for exactly one of said predetermined search codes in response to input word units of at least one of said lexical categories.

7. A natural language interface according to claim 1, wherein said searching means is operable to perform a search for a plurality of different predetermined search codes in response to input word units of at least one of said lexical categories.

8. A natural language interface according to claim 1, wherein said selecting means and said searching means comprise a look-up table containing instructions for said selecting and for said searching for each of said lexical categories.

9. A natural language interface according to claim 1, wherein, for at least one of said lexical categories, a predetermined search code is deselected if found in a search performed in response to word units of said at least one category.

10. A natural language interface according to claim 9, wherein said selecting means and said searching means comprise a look-up table containing instructions for said selecting and for said searching for each of said lexical categories, and wherein said look-up table includes instructions for performing said deselection.

11. A natural language interface according to claim 1, wherein each said data unit comprises a first part identifying said data unit and a second part for defining said links, said link generating means being operable to generate said links utilizing second parts of said data units.

12. A natural language interface according to claim 11, wherein said link generating means is operable to assign values to the second parts of said data units, and is also operable to generate said links by relating different values of different data units to each other dependent upon searching results of said searching means.

13. A natural language interface according to claim 11, wherein each said data unit is in the form of a predicate having an argument, the first part of said data unit comprising the predicate and the second part comprising the argument.

14. A natural language interface according to claim 13, wherein said link generating means is operable to assign successive values in a series to said arguments as successive said data units are generated, and is also operable to generate said links by equating values assigned to arguments of different data units to each other in response to searching results of said searching means.

15. A natural language interface according to claim 14, wherein said link generating means is operable to instantiate values in said arguments dependent upon the equated values formed.

16. A natural language interface according to claim 13, wherein each said data unit corresponding to a word unit in lexical categories in a first group is provided with at least two arguments, and wherein each said data unit corresponding to a word unit in lexical categories in a second group is provided with at least three arguments.

17. A natural language interface according to claim 16, wherein said lexical categories in said first group include at least one category from the following: nouns, auxiliary verbs, negation, "to" as an infinitival particle, intransitive verbs, determiners, adjectives, adverbs and intensifiers.

18. A natural language interface according to claim 16, wherein said lexical categories of said second group comprise at least one category from the following: prepositions, transitive verbs and "to verbs".

19. A natural language interface according to claim 16, wherein said link generating means, when generating links in response to a current data unit generated from a word unit of a lexical category of said first group, (a) utilizes a first of said arguments for generating links between the current data unit and another data unit generated from a word unit which qualifies the word unit from which said current data unit is generated, and (b) utilizes a second of said arguments for generating links between the current data unit and at least one other data unit generated from a word unit which is qualified by the word unit from which the current data unit is generated.

20. A natural language interface according to claim 16, wherein said link generating means, when generating links in response to a current data unit generated from a word unit of a lexical category of said second group, (a) utilizes a first of said arguments for generating links between the current data unit and another data unit generated from a word unit which qualifies the word unit from which said current data unit is generated, and (b) utilizes said second and third arguments for generating links between the current data unit and at least one other data unit generated from a word unit which is qualified by the word unit from which the current data unit is generated.

21. A natural language interface according to claim 13, wherein said link generating means is operable, when generating links in response to a data unit and in response to a predetermined search result of said searching means, to generate a plurality of links between the current data unit and a plurality of previously generated said data units, wherein said plurality of links are defined utilizing the same argument of the current data unit, and wherein said link generating means is further operable to generate a different respective link for each of said plurality of defined links.

22. A natural language interface according to claim 13, wherein said link generating means is operable, in response to a predetermined search result of said searching means, to generate a link between each of a plurality of said data units on the one hand, and a common previously generated data unit on the other hand, utilizing the same argument of said common previously generated data unit for defining each of said links, and wherein link generating means is operable to define a different link corresponding to each of said plurality of links.

23. A natural language interface according to any one of claims 13 to 22, wherein said link generating means is operable to generate first and second links between a first data unit and a second data unit, one of said first and second links being generated utilizing one argument of said first data unit and one of plural arguments of said second data units, and the other of said first and second links being defined by the same argument of said first data unit and a different argument of said second data unit, and said link generating means is operable to define different links for each of said links.

24. A natural language interface according to claim 1, wherein said searching means is operable, when searching in response to a data unit generated in response to input of a word unit which may qualify a previous word unit, to search for all occurrences of the predetermined search codes which may have been selected in response to a data unit previously generated from said previous word unit, and wherein said link generating means is operable to generate a link for each occurrence found.

25. A natural language interface according to claim 1, wherein said searching means is operable, when searching in response to a data unit generated in response to a word unit which may be qualified by a previous word unit, to terminate said search upon finding the latest selected occurrence of a search code selected in response to a data unit generated from said previous word unit, and wherein said link generating means is operable to generate a link for each occurrence found.

26. A natural language interface according to claim 1, wherein said selecting means selects search codes subsequent to said searching means searching for predetermined search codes.

27. A natural language interface according to claim 1, wherein said data unit generating means is operable to proceed with the generation of each data unit without awaiting receipt of any subsequent data unit.

28. A natural language interface according to claim 1, including control signal generating means responsive to said data structured in computer usable form for generating a control signal dependent thereon.

29. A natural language interface according to claim 28, wherein said control signal generating means includes a knowledge base and means for processing said data structured in computer usable form against said knowledge base for generating said control signal.

30. A method for providing a natural language interface to a computer, the interface generating data structured in a computer usable form derived from input data in the form of word units in the natural language, said word units comprised of a plurality of different lexical categories, said method comprising the steps of:

(a) defining the word units of said natural language which may be processed by the interface;

(b) generating computer usable data units in response to input of said word units of said natural language, wherein different data units are generated for different word units of said natural language;

(c) defining a plurality of different search codes;

(d) selecting, in response to input of word units of at least some of said lexical categories, search codes from said plurality of different search codes, the selected search codes being selected based on the lexical category of the input word unit, the selected search codes being usable to generate links only between the data unit generated in said generating step in response to input of the current word unit and one or more subsequently generated data units;

(e) searching, in response to input of word units in at least some of said lexical categories, for predetermined search codes which have been previously selected, the predetermined search codes being dependent upon the lexical category of the word unit; and (f) in response to said predetermined search codes being found in said searching step, generating links between data units to provide said data structured in computer usable form.

31. A method according to claim 30, wherein said step of generating data units comprises accessing a lexicon to obtain therefrom both the lexical category of the word units and said data units.

32. A method according to claim 30, wherein in said selecting step exactly one of said search codes is selected in response to input word units of at least one of said lexical categories.

33. A method according to claim 30, wherein in said selecting step a plurality of different search codes are selected in response to input word units of at least one of said lexical categories.

34. A method according to claim 30, wherein in said searching step no search for said predetermined search codes is performed in response to input word units of at least one of said lexical categories.

35. A method according to claim 30, wherein in said searching step a search for exactly one of said predetermined search codes is performed in response to input word units of at least one of said lexical categories.

36. A method according to claim 30, wherein in said searching step a search for a plurality of different predetermined search codes is performed in response to input word units of at least one of said lexical categories.

37. A method according to claim 30, wherein said selecting step and said searching step are performed in accordance with instructions stored in a look-up table.

38. A method according to claim 30, wherein, for at least one of said lexical categories, a predetermined search code is deselected if found in a search performed in response to word units of said at least one category.

39. A method according to claim 38, wherein said selecting step and said searching step are performed in accordance with instructions stored in a look-up table, and wherein said look-up table includes instructions for performing said deselection.

40. A method according to claim 30, wherein each said data unit comprises a first part identifying said data unit and a second part for defining said links, said link generating step being performed so as to generate said links utilizing second parts of said data units.

41. A method according to claim 40, wherein said link generating step is performed so as to assign values to the second parts of said data units, and so as to generate said links by relating different values of different data units to each other dependent upon searching results of said searching step.

42. A method according to claim 40, wherein each said data unit is in the form of a predicate having an argument, the first part of said data unit comprising the predicate and the second part comprising the argument.

43. A method according to claim 42, wherein said link generating step is performed so as to assign successive values in a series to said arguments as successive said data units are generated, and so as to generate said links by equating values assigned to arguments of different data units to each other in response to searching results of said searching step.

44. A method according to claim 43, wherein said link generating step is performed so as to instantiate values in said arguments dependent upon the equated values formed.

45. A method according to claim 42, wherein each said data unit corresponding to a word unit in lexical categories in a first group is provided with at least two arguments, and wherein each said data unit corresponding to a word unit in lexical categories in a second group is provided with at least three arguments.

46. A method according to claim 45, wherein said lexical categories in said first group include at least one category from the following: nouns, auxiliary verbs, negation, "to" as an infinitival particle, intransitive verbs, determiners, adjectives, adverbs and intensifiers.

47. A method according to claim 45, wherein said lexical categories of said second group comprise at least one category from the following: prepositions, transitive verbs and "to verbs".

48. A method according to claim 45, wherein said link generating step, when generating links in response to a current data unit generated from a word unit of a lexical category of said first group, (a) utilizes a first of said arguments to generate links between the current data unit and another data unit generated from a word unit which qualifies the word unit from which said current data unit is generated, and (b) utilizes a second of said arguments to generate links between the current data unit and at least one other data unit generated from a word unit which is qualified by the word unit from which the current data unit is generated.

49. A method according to claim 45, wherein in said link generating step, when generating links in response to a current data unit generated from a word unit of a lexical category of said second group, (a) utilizes a first of said arguments to generate links between the current data unit and another data unit generated from a word unit which qualifies the word unit from which said current data unit is generated, and (b) utilizes said second and third arguments to generate links between the current data unit and at least one other data unit generated from a word unit which is qualified by the word unit from which the current data unit is generated.

50. A method according to claim 42, wherein in said link generating step, when generating links in response to a data unit and in response to a predetermined search result of said searching step, generates a plurality of links between the current data unit and a plurality of previously generated data units, wherein said plurality of links are defined utilizing the same argument of the current data unit, and wherein said link generating step further generates a different respective link for each of said plurality of defined links.

51. A method according to claim 42, wherein in said link generating step, in response to a predetermined search result of said searching step, a link is generated between each of a plurality of said data units on the one hand, and a common previously generated data unit on the other hand, utilizing the same argument of said common previously generated data unit for defining each of said links, and wherein a different link is defined corresponding to each of said plurality of links.

52. A method according to any one of claims 42 to 51, wherein in said link generating step, first and second links are generated between a first data unit and a second data unit, one of said first and second links being generated utilizing one argument of said first data unit and one of plural arguments of said second data units, and the other of said first and second links being defined by the same argument of said first data unit and a different argument of said second data unit, and different links are defined for each of said links.

53. A method according to claim 30, wherein in said searching step, when searching in response to a data unit generated in response to input of a word unit which may qualify a previous word unit, all occurrences of the predetermined search codes are searched for which may have been selected in response to a data unit previously generated from said previous word unit, and wherein said link is generated for each occurrence found.

54. A method according to claim 30, wherein in said searching step, when searching in response to a data unit generated in response to a word unit which may be qualified by a previous word unit, said search is terminated upon finding the latest selected occurrence of a search code selected in response to a data unit generated from said previous word unit, and wherein said link is generated for each occurrence found.

55. A method according to claim 30, wherein said selecting step selects search codes subsequent to said searching step searching for predetermined search codes.

56. A method according to claim 30, wherein in said data unit generating step, the generation of each data unit is proceeded with without awaiting receipt of any subsequent data unit.

57. A method according to claim 30, further comprising a control signal generating step in which a control signal is generated dependent on said data structured in computer usable form.

58. A method according to claim 57, wherein in said control signal generating step includes processing said data structured in computer usable form against said knowledge base for generating said control signal.

59. A record carrier storing program instructions to cause a computer to provide an interface which generates data structured in a computer usable form derived from input data in the form of word units in a natural language, said word units comprised of a plurality of lexical different categories, said stored program instructions comprising:

(a) instructions to cause the computer to define the word units of said natural language which may be processed by the interface;

(b) instructions to cause the computer to generate computer usable data units in response to input of said word units of said natural language, wherein different data units are generated for different word units of said natural language;

(c) instructions to cause the computer to define a plurality of different search codes;

(d) instructions to cause the computer to select, in response to input of word units of at least some of said lexical categories, search codes from said plurality of different search codes, the selected search codes being selected based on the lexical category of the input word unit, the selected search codes being usable to generate links only between the data unit generated in response to input of the current word unit and one or more subsequently generated data units;

(e) instructions to cause the computer to search, in response to input of word units in at least some of said lexical categories, for predetermined search codes which have been previously selected, the predetermined search codes being dependent upon the lexical category of the word unit; and (f) instructions to cause the computer to respond to said predetermined search codes being found and to generate links between data units to provide said data structured in computer usable form.

60. Computer-executable process steps, stored on a computer-readable medium, which provide a natural language interface to a computer by generating data structured in a computer usable form derived from input data in the form of word units in the natural language, said computer-executable process steps comprising:

(a) a step to define the word units of said natural language which may be processed by the interface;

(b) a step to generate computer usable data units in response to input of said word units of said natural language, wherein different data units are generated for different word units of said natural language;

(c) a step to define a plurality of different search codes;

(d) a step to select, in response to input of word units of at least some of said lexical categories, search codes from said plurality of different search codes, the selected search codes being selected based on the lexical category of the input word unit, the selected search codes being usable to generate links only between the data unit generated in said generating step in response to input of the current word unit and one or more subsequently generated data units;

(e) a step to search, in response to input of word units in at least some of said lexical categories, for predetermined search codes which have been previously selected, the predetermined search codes being dependent upon the lexical category of the word unit; and (f) a step to generate links between data units to provide said data structured in computer usable form, in response to said predetermined search codes found.

61. Switching apparatus comprising a plurality of switches and computer apparatus according to claim 28 for controlling said switches, said computer apparatus being arranged for receiving instructions for actuating said switches, for generating from said instructions said data units, and for generating control signals so as to actuate said switches in response to said instructions.

62. A switching method for switching a plurality of switches including a method according to claim 57 for controlling said switches in which instructions are received for actuating said switches, said data units are generated from said instructions, and said control signals generated so as to actuate said switches in response to said instructions.

* * * * *

UNITED STATES PATENT AND TRADEMARK OFFICE
CERTIFICATE OF CORRECTION

PATENT NO. : 5,870,701

DATED : February 9, 1999

INVENTOR(S) : Thomas Juliusz Wachtel

It is certified that error appears in the above-identified patent and that said Letters Patent is hereby corrected as shown below:

On the cover page, in the second line of the first reference listed under "Other Publications", change "Understand-to" to --Understanding To--.

Column 4, line 46, change "words ie" to --words, i.e.,--.

Column 5, lines 60-62, delete
"WORD CATEGORY     INPUT WORD"

Column 8, line 62, change "three-numbers" to --three numbers--.

Column 10, line 30, change "f or" to --for--.

Column 13, line 52, change "210" to --210, which--.

Column 20, line 23, change " floor" ie." to -- floor", i.e.,--; and
line 38, change "qualify both to" to --qualifies both--.

Column 21, line 21, change "initially store" to --input buffer--.

UNITED STATES PATENT AND TRADEMARK OFFICE
CERTIFICATE OF CORRECTION

PATENT NO. : 5,870,701

DATED : February 9, 1999

INVENTOR(S) : Thomas Juliusz Wachtel

It is certified that error appears in the above-identified patent and that said Letters Patent is hereby corrected as shown below:

Column 22, line 18, change "numbers-906" to --numbers 906--; and line 31, change "this." to --this--.

Column 24, line 19, change "qualify" to --qualifying--.

Column 27, line 16, change "unprocessed ie." to --unprocessed, i.e.,--.

Column 31, line 16, change "ie." to --i.e.,--; and line 22, change "corresponding the" to --corresponding to--.

Column 33, line 60, change "performed ie." to --performed, i.e.,--.

Column 37, line 67, change "switch (c3,x3)in Table 4)." to --"switch (c3, x3)" in Table 4.--

UNITED STATES PATENT AND TRADEMARK OFFICE
CERTIFICATE OF CORRECTION

PATENT NO. : 5,870,701

DATED : February 9, 1999

INVENTOR(S) : Thomas Juliusz Wachtel

It is certified that error appears in the above-identified patent and that said Letters Patent is hereby corrected as shown below:

```
     Column 42, Tabular Summary III, "switch(c,cs)" and
"switch(l,ls) should be moved under the column "TO TABLE
154"; and "switch(C3,X3)" and "switch(L3,X6)" should be
moved under the column "PROOF FROM TABLE 156".

Column 43, line 32, change "that" to --but--.

Column 45, line 5, change "signal" to --signals--.
```

Signed and Sealed this

Twenty-eighth Day of March, 2000

Attest:

Q. TODD DICKINSON

*Attesting Officer*     *Commissioner of Patents and Trademarks*